(12) United States Patent
Bradley et al.

(10) Patent No.: US 12,236,517 B2
(45) Date of Patent: Feb. 25, 2025

(54) TECHNIQUES FOR MULTI-VIEW NEURAL OBJECT MODELING

(71) Applicants: DISNEY ENTERPRISES, INC., Burbank, CA (US); ETH Zürich (Eidgenössische Technische Hochschule Zürich), Zürich (CH)

(72) Inventors: Derek Edward Bradley, Zurich (CH); Prashanth Chandran, Zurich (CH); Paulo Fabiano Urnau Gotardo, Zurich (CH); Daoye Wang, Zurich (CH); Gaspard Zoss, Zurich (CH)

(73) Assignees: Disney Enterprises, INC., Burbank, CA (US); ETH Zürich (Eidgenössische Technische Hochschule Zürich), Zurich (CH)

(*) Notice: Subject to any disclaimer, the term of this patent is extended or adjusted under 35 U.S.C. 154(b) by 38 days.

(21) Appl. No.: 17/983,246

(22) Filed: Nov. 8, 2022

(65) Prior Publication Data
US 2023/0154101 A1 May 18, 2023

Related U.S. Application Data

(60) Provisional application No. 63/280,101, filed on Nov. 16, 2021.

(51) Int. Cl.
*G06T 15/06* (2011.01)
*G06T 7/62* (2017.01)
*G06T 15/04* (2011.01)

(52) U.S. Cl.
CPC ............... *G06T 15/06* (2013.01); *G06T 7/62* (2017.01); *G06T 15/04* (2013.01); *G06T 2207/20081* (2013.01); *G06T 2207/20084* (2013.01)

(58) Field of Classification Search
CPC .. G06T 15/06; G06T 7/62; G06T 15/04; G06T 2207/20081; G06T 2207/20084
See application file for complete search history.

(56) References Cited

U.S. PATENT DOCUMENTS

| | | | |
|---|---|---|---|
| 6,011,914 A * | 1/2000 | Akiyama | G06F 30/23 703/14 |
| 8,117,141 B1 * | 2/2012 | Srinivasa | G05B 13/0265 706/14 |

(Continued)

FOREIGN PATENT DOCUMENTS

WO     01/63561 A1    8/2001

OTHER PUBLICATIONS

Zhang, Kai, et al. "Nerf++: Analyzing and improving neural radiance fields." arXiv preprint arXiv:2010.07492 (2020). (Year: 2020).*

(Continued)

*Primary Examiner* — Charles L Beard
(74) *Attorney, Agent, or Firm* — Squire Patton Boggs LLP; Sarah Mirza

(57) ABSTRACT

Techniques are disclosed for generating photorealistic images of objects, such as heads, from multiple viewpoints. In some embodiments, a morphable radiance field (MoRF) model that generates images of heads includes an identity model that maps an identifier (ID) code associated with a head into two codes: a deformation ID code encoding a geometric deformation from a canonical head geometry, and a canonical ID code encoding a canonical appearance within a shape-normalized space. The MoRF model also includes a deformation field model that maps a world space position to a shape-normalized space position based on the deformation ID code. Further, the MoRF model includes a canonical neural radiance field (NeRF) model that includes a density multi-layer perceptron (MLP) branch, a diffuse MLP branch, and a specular MLP branch that output densities, diffuse (Continued)

colors, and specular colors, respectively. The MoRF model can be used to render images of heads from various viewpoints.

20 Claims, 11 Drawing Sheets

(56) References Cited

U.S. PATENT DOCUMENTS

| | | | | |
|---|---|---|---|---|
| 9,646,195 B1* | 5/2017 | Kim | | G06V 40/171 |
| 10,706,503 B2* | 7/2020 | Schroers | | G06T 5/73 |
| 10,776,985 B2* | 9/2020 | Liu | | G06T 15/506 |
| 11,157,773 B2* | 10/2021 | Smith | | G06V 10/764 |
| 11,288,546 B2* | 3/2022 | Lee | | G06N 3/047 |
| 11,721,064 B1* | 8/2023 | Aksoy | | G06N 20/00 345/418 |
| 11,763,478 B1* | 9/2023 | Yang | | G06T 7/62 |
| 11,823,319 B2* | 11/2023 | Hansson Soederlund | | G06T 15/10 |
| 11,830,159 B1* | 11/2023 | Mann | | G10L 15/02 |
| 11,908,066 B2* | 2/2024 | Barreiro | | A63F 13/52 |
| 11,922,558 B2* | 3/2024 | Chen | | G06T 19/20 |
| 11,922,580 B2* | 3/2024 | Tang | | G06V 20/36 |
| 11,935,177 B2* | 3/2024 | Ouyang | | G06T 15/06 |
| 11,935,179 B2* | 3/2024 | Müller | | G06N 3/10 |
| 11,935,209 B1* | 3/2024 | Barsky | | G06T 17/00 |
| 12,033,277 B2* | 7/2024 | Luo | | G06V 10/82 |
| 12,056,807 B2* | 8/2024 | Cappello | | G06T 15/506 |
| 2007/0080967 A1* | 4/2007 | Miller | | G06V 20/653 345/473 |
| 2007/0177797 A1* | 8/2007 | Smith | | G06V 10/60 382/164 |
| 2011/0254950 A1* | 10/2011 | Bibby | | G06T 7/11 382/173 |
| 2012/0230570 A1* | 9/2012 | Zheng | | G06T 7/12 382/131 |
| 2013/0129170 A1* | 5/2013 | Zheng | | G06T 7/149 382/131 |
| 2013/0314437 A1* | 11/2013 | Fujiwara | | G06V 40/165 345/629 |
| 2013/0346047 A1* | 12/2013 | Fukushige | | G06F 30/15 703/8 |
| 2014/0267306 A1* | 9/2014 | Koniaris | | G06T 13/20 345/473 |
| 2016/0275720 A1* | 9/2016 | Dehais | | G06T 17/20 |
| 2016/0364880 A1* | 12/2016 | Barratt | | G06T 7/149 |
| 2017/0039761 A1* | 2/2017 | Zhang | | G06T 7/13 |
| 2017/0061673 A1* | 3/2017 | Park | | G06T 15/06 |
| 2017/0131090 A1* | 5/2017 | Bronstein | | H04N 5/2226 |
| 2017/0200303 A1* | 7/2017 | Havran | | G06T 17/10 |
| 2017/0337904 A1* | 11/2017 | Du | | G09G 3/3225 |
| 2017/0347055 A1* | 11/2017 | Dore | | G06T 7/90 |
| 2018/0293710 A1* | 10/2018 | Meyer | | G06T 5/70 |
| 2018/0293711 A1* | 10/2018 | Vogels | | G06F 17/10 |
| 2018/0293713 A1* | 10/2018 | Vogels | | G06V 10/82 |
| 2018/0365874 A1* | 12/2018 | Hadap | | G06N 3/045 |
| 2019/0251735 A1* | 8/2019 | Fleureau | | G06T 3/4015 |
| 2019/0295302 A1* | 9/2019 | Fu | | G06T 11/00 |
| 2019/0304069 A1* | 10/2019 | Vogels | | G06N 20/00 |
| 2019/0318469 A1* | 10/2019 | Wang | | G06N 3/08 |
| 2020/0051317 A1* | 2/2020 | Muthler | | G06N 5/02 |
| 2020/0082641 A1* | 3/2020 | Watanabe | | G06T 15/50 |
| 2020/0286284 A1* | 9/2020 | Grabli | | G06T 13/40 |
| 2020/0342684 A1* | 10/2020 | Kinsella | | G06T 7/344 |
| 2020/0367970 A1* | 11/2020 | Qiu | | A61B 90/36 |
| 2020/0380762 A1* | 12/2020 | Karafin | | G02B 3/0006 |
| 2020/0380763 A1* | 12/2020 | Abramov | | G06N 3/045 |
| 2020/0401790 A1* | 12/2020 | Hu | | G06T 3/18 |
| 2021/0049807 A1* | 2/2021 | Wright | | G06T 15/06 |
| 2021/0074052 A1* | 3/2021 | Ha | | G06T 15/005 |
| 2021/0224516 A1* | 7/2021 | Jain | | G06F 18/2431 |
| 2021/0225090 A1* | 7/2021 | Tang | | G06T 19/003 |
| 2021/0241521 A1* | 8/2021 | Zhe | | G06N 3/047 |
| 2021/0279942 A1* | 9/2021 | Petkov | | G06T 15/06 |
| 2021/0295594 A1* | 9/2021 | Sinha | | G06V 20/64 |
| 2021/0358198 A1* | 11/2021 | Pantaleoni | | G06T 17/20 |
| 2021/0390761 A1* | 12/2021 | Kowalski | | G06T 15/205 |
| 2022/0051481 A1* | 2/2022 | Laine | | G06T 7/97 |
| 2022/0103721 A1* | 3/2022 | Matsubara | | H04N 1/6033 |
| 2022/0130101 A1* | 4/2022 | Abramov | | G06N 3/08 |
| 2022/0198731 A1* | 6/2022 | Lombardi | | G06T 7/73 |
| 2022/0239844 A1* | 7/2022 | Lv | | G06T 15/205 |
| 2022/0245910 A1* | 8/2022 | Lombardi | | G06T 13/40 |
| 2022/0254106 A1* | 8/2022 | Lu | | G06V 10/454 |
| 2022/0254121 A1* | 8/2022 | Xu | | G06T 17/20 |
| 2022/0284657 A1* | 9/2022 | Müller | | G06N 3/084 |
| 2022/0284658 A1* | 9/2022 | Muller et al. | | G06N 3/084 |
| 2022/0301252 A1* | 9/2022 | Wang | | G06N 3/048 |
| 2022/0301257 A1* | 9/2022 | Garbin | | G06N 3/045 |
| 2022/0309742 A1* | 9/2022 | Bigos | | G06T 15/06 |
| 2022/0309744 A1* | 9/2022 | Bigos | | G06N 3/04 |
| 2022/0309745 A1* | 9/2022 | Bigos | | G06V 10/7747 |
| 2022/0327730 A1* | 10/2022 | Meier | | G06T 15/06 |
| 2022/0335636 A1* | 10/2022 | Bi | | G06T 7/586 |
| 2022/0351459 A1* | 11/2022 | Smith-Lacey | | G06T 15/005 |
| 2022/0351460 A1* | 11/2022 | Fenney | | G06T 15/06 |
| 2022/0375153 A1* | 11/2022 | Fenney | | G06T 15/005 |
| 2023/0027890 A1* | 1/2023 | Zhao | | G06T 15/04 |
| 2023/0177822 A1* | 6/2023 | Casser | | G06T 5/50 382/156 |
| 2023/0186562 A1* | 6/2023 | Yun | | G06T 7/55 345/418 |
| 2023/0260200 A1* | 8/2023 | Aroudj | | G06T 15/20 345/418 |
| 2023/0262208 A1* | 8/2023 | Appelgate | | H04N 19/46 348/41 |
| 2023/0274494 A1* | 8/2023 | Mahmood | | G06T 19/00 345/424 |
| 2023/0281906 A1* | 9/2023 | Kozlowski | | G06T 5/70 345/419 |
| 2023/0281913 A1* | 9/2023 | Rematas | | G06T 17/10 345/419 |
| 2023/0281955 A1* | 9/2023 | Ackerson | | G06V 10/762 382/274 |
| 2023/0298263 A1* | 9/2023 | Yang | | G06T 7/50 382/100 |
| 2023/0316633 A1* | 10/2023 | Wu | | G06T 15/50 345/426 |
| 2023/0334764 A1* | 10/2023 | Lee | | G06T 15/10 |
| 2023/0343018 A1* | 10/2023 | Shi | | G06T 15/005 |
| 2023/0360182 A1* | 11/2023 | Fanello | | G06T 5/92 |
| 2023/0360311 A1* | 11/2023 | Ouyang | | G06T 15/506 |
| 2023/0360372 A1* | 11/2023 | Zhao | | G06V 10/761 |
| 2023/0362347 A1* | 11/2023 | Johnson | | G06V 10/7715 |
| 2023/0377180 A1* | 11/2023 | Ambrus | | G06T 15/20 |
| 2023/0386107 A1* | 11/2023 | Aluru | | G06N 3/04 |
| 2023/0394740 A1* | 12/2023 | Kim | | G06T 15/08 |
| 2023/0419507 A1* | 12/2023 | Planche | | G06T 7/90 |
| 2024/0013477 A1* | 1/2024 | Xu | | G06T 15/06 |
| 2024/0020897 A1* | 1/2024 | Wang | | G06N 3/084 |
| 2024/0020915 A1* | 1/2024 | Zhang | | G06N 3/045 |
| 2024/0037829 A1* | 2/2024 | Valentin | | G06T 15/20 |
| 2024/0037837 A1* | 2/2024 | Krol | | H04N 7/157 |
| 2024/0046516 A1* | 2/2024 | Anciukevicius | | G06T 7/75 |
| 2024/0046563 A1* | 2/2024 | Carlson | | G06N 3/084 |
| 2024/0046569 A1* | 2/2024 | Choi | | G06T 17/00 |
| 2024/0046583 A1* | 2/2024 | Xiong | | G06T 7/579 |
| 2024/0054716 A1* | 2/2024 | Jang | | G06T 15/06 |
| 2024/0062391 A1* | 2/2024 | Pourian | | G06T 7/246 |
| 2024/0062495 A1* | 2/2024 | Shu | | G06T 17/00 |
| 2024/0070762 A1* | 2/2024 | Wang | | G06V 10/82 |
| 2024/0070809 A1* | 2/2024 | Xu | | G06T 3/4046 |
| 2024/0070874 A1* | 2/2024 | Kocabas | | G06T 7/20 |
| 2024/0070955 A1* | 2/2024 | Li | | G06T 7/246 |
| 2024/0070972 A1* | 2/2024 | Kosiorek | | G06N 3/045 |
| 2024/0070984 A1* | 2/2024 | Trojansky | | G06T 1/0014 |
| 2024/0095097 A1* | 3/2024 | Pottorff | | G06T 1/20 |
| 2024/0095993 A1* | 3/2024 | Muthler | | G06T 15/30 |
| 2024/0095995 A1* | 3/2024 | Muthler | | G06T 15/30 |
| 2024/0096001 A1* | 3/2024 | Sajjadi | | G06T 15/06 |
| 2024/0096050 A1* | 3/2024 | Ouyang | | G06T 5/70 |
| 2024/0098216 A1* | 3/2024 | Pottorff | | H04N 19/132 |

(56) References Cited

U.S. PATENT DOCUMENTS

| | | | |
|---|---|---|---|
| 2024/0104822 A1* | 3/2024 | Rao | G06T 15/005 |
| 2024/0119671 A1* | 4/2024 | Liu | G06T 7/60 |
| 2024/0135632 A1* | 4/2024 | Ahn | G06T 15/06 |
| 2024/0135634 A1* | 4/2024 | Sagong | G06T 15/205 |
| 2024/0153213 A1* | 5/2024 | Bao | G06T 7/80 |
| 2024/0161391 A1* | 5/2024 | Bradley | G06T 7/90 |
| 2024/0169653 A1* | 5/2024 | Lakshminarayana | G06T 15/06 |
| 2024/0249459 A1* | 7/2024 | Bradley | G06T 13/40 |
| 2024/0290007 A1* | 8/2024 | Sagong | G06T 7/90 |
| 2024/0331330 A1* | 10/2024 | Cooper | G06T 13/40 |

OTHER PUBLICATIONS

Park, Keunhong, et al. "Nerfies: Deformable neural radiance fields." Proceedings of the IEEE/CVF International Conference on Computer Vision. 2021. (Year: 2021).*

Pumarola, Albert, et al. "D-nerf: Neural radiance fields for dynamic scenes." Proceedings of the IEEE/CVF Conference on Computer Vision and Pattern Recognition. 2021. (Year: 2021).*

Yu, Alex, et al. "pixelnerf: Neural radiance fields from one or few images." Proceedings of the IEEE/CVF conference on computer vision and pattern recognition. 2021. (Year: 2021).*

Goncharov, Alexander, and Linhui Shen. "Geometry of canonical bases and mirror symmetry." Inventiones mathematicae 202 (2015): 487-633. (Year: 2015).*

Abdal et al., "Image2StyleGAN: How to Embed Images Into the StyleGAN Latent Space?", In Proceedings of the IEEE International Conference on Computer Vision (ICCV), DOI: 10.1109/ICCV.2019.00453, 2019, pp. 4432-4441.

Abdal et al., "Image2StyleGAN++: How to Edit the Embedded Images?", In Proceedings of the IEEE International Conference on Computer Vision (ICCV), DOI: 10.1109/CVPR42600.2020.00832, 2020, pp. 8296-8305.

Abrevaya et al., "A Decoupled 3D Facial Shape Model by Adversarial Training", In Proceedings of the IEEE International Conference on Computer Vision (ICCV), DOI: 10.1109/ICCV.2019.00951, 2019, pp. 9419-9428.

Athar et al., "FLAME-in-NeRF: Neural control of Radiance Fields for Free View Face Animation", arXiv:2108.04913, Aug. 10, 2021, 16 pages.

Blanz et al., "A Morphable Model For The Synthesis Of 3D Faces", SIGGRAPH '99: Proceedings of the 26th annual Conference on Computer Graphics and Interactive Techniques, Jul. 1999, pp. 187-194.

Chan et al., "pi-GAN: Periodic Implicit Generative Adversarial Networks for 3D-Aware Image Synthesis", In Proceedings of the IEEE Conference on Computer Vision and Pattern Recognition (CVPR), 2021, pp. 5799-5809.

Chandran et al., "Semantic Deep Face Models", In Proceedings of the IEEE International Conference on 3D Vision (3DV), DOI: 10.1109/3DV50981.2020.00044, 2020, pp. 345-354.

Chandran et al., "Rendering with Style: Combining Traditional and Neural Approaches for High-Quality Face Rendering", ACM Transactions on Graphics, vol. 40, No. 6, Article 223, Dec. 2021, pp. 223:1-223:14.

Cootes et al., "Active Appearance Models", IEEE Transactions On Pattern Analysis And Machine Intelligence, vol. 23, No. 6, Jun. 2001, pp. 681-685.

Devries et al., "Unconstrained Scene Generation with Locally Conditioned Radiance Fields", In Proceedings of the IEEE International Conference on Computer Vision (ICCV), 2021, pp. 14304-14313.

Egger et al., "3D Morphable Face Models-Past, Present, and Future", ACM Transactions on Graphics, DOI: 10.1145/3395208, vol. 39, No. 5, Article 157, Jun. 2020, pp. 157:1-157:38.

Gafni et al., "Dynamic Neural Radiance Fields for Monocular 4D Facial Avatar Reconstruction", In Proceedings of the IEEE Conference on Computer Vision and Pattern Recognition (CVPR), 2021, pp. 8649-8658.

Gao et al., "Portrait Neural Radiance Fields from a Single Image", arXiv:2012.05903, Dec. 10, 2020, 10 pages.

Gong et al., "SpiralNet++: A Fast and Highly Efficient Mesh Convolution Operator", In Proceedings of the IEEE International Conference on Computer Vision (ICCV), 2019, 8 pages.

Gu et al., "StyleNeRF: A Style-based 3D-aware Generator For High-resolution Image Synthesis", Retrieved from https://jiataogu.me/style_nerf/files/StyleNeRF.pdf., ICLR, 2022, 25 pages.

Härkönen et al., "GANSpace: Discovering Interpretable GAN Controls", 34th Conference on Neural Information Processing Systems, 2020, 10 pages.

Karras et al., "Alias-Free Generative Adversarial Networks", 35th Conference on Neural Information Processing Systems, 2021, 12 pages.

Karras et al., "A Style-Based Generator Architecture for Generative Adversarial Networks", In Proceedings of the IEEE Conference on Computer Vision and Pattern Recognition (CVPR), 2019, pp. 4401-4410.

Karras et al., "Analyzing and Improving the Image Quality of StyleGAN", In Proceedings of the IEEE Conference on Computer Vision and Pattern Recognition (CVPR), 2020, pp. 8110-8119.

Li et al., "Learning a model of facial shape and expression from 4D scans", ACM Transactions on Graphics, DOI: 10.1145/3130800.3130813, vol. 36, No. 6, Article 194, Nov. 2017, pp. 194:1-194:17.

Li et al., "Neural Scene Flow Fields for Space-Time View Synthesis of Dynamic Scenes", In Proceedings of the IEEE Conference on Computer Vision and Pattern Recognition (CVPR), 2021, pp. 6498-6508.

Lombardi et al., "Neural vols. Learning Dynamic Renderable Volumes from Images", ACM Transactions on Graphics, arXiv:1906.07751, vol. 38, No. 4, Article 65, Jul. 2019, pp. 65:1-65:14.

Ma et al., "Pixel Codec Avatars", In Proceedings of the IEEE Conference on Computer Vision and Pattern Recognition (CVPR), 2021, pp. 64-73.

Martin-Brualla et al., "NeRF in the Wild: Neural Radiance Fields for Unconstrained Photo Collections", In Proceedings of the IEEE Conference on Computer Vision and Pattern Recognition (CVPR), 2021, pp. 7210-7219.

Mildenhall et al., "NeRF: Representing Scenes as Neural Radiance Fields for View Synthesis", arXiv:2003.08934, Aug. 3, 2020, 25 pages.

Newcombe et al., "DynamicFusion: Reconstruction and Tracking of Non-rigid Scenes in Real-Time", In Proceedings of the IEEE Conference on Computer Vision and Pattern Recognition (CVPR), 2015, pp. 343-352.

Nguyen-Phuoc et al., "HoloGAN: Unsupervised Learning of 3D Representations From Natural Images", IEEE International Conference on Computer Vision (ICCV), 2019, pp. 7588-7597.

Niemeyer et al., "Giraffe: Representing Scenes as Compositional Generative Neural Feature Fields", In Proceedings of the IEEE Conference on Computer Vision and Pattern Recognition, 2021, pp. 11453-11464.

Park et al., "Nerfies: Deformable Neural Radiance Fields", In Proceedings of the IEEE International Conference on Computer Vision (ICCV), 2021, pp. 5865-5874.

Park et al., "HyperNeRF: A Higher-Dimensional Representation for Topologically Varying Neural Radiance Fields", arXiv:2106.13228, Sep. 10, 2021, pp. 1:2-1:16.

Ploumpis et al., "Towards a complete 3D morphable model of the human head", arXiv:1911.08008, Feb. 19, 2020, 18 pages.

Pumarola et al., "D-NeRF: Neural Radiance Fields for Dynamic Scenes", arXiv:2011.13961, Nov. 27, 2020, 10 pages.

Raj et al., "Pixel-aligned Volumetric Avatars", arXiv:2101.02697, Jan. 7, 2021, 10 pages.

Ramon et al., "H3D-Net: Few-Shot High-Fidelity 3D Head Reconstruction", In Proceedings of the IEEE/CVF International Conference on Computer Vision, 2021, pp. 5620-5629.

Ranjan et al., "Generating 3D faces using Convolutional Mesh Autoencoders", In European Conference on Computer Vision, 2018, 17 pages.

(56) References Cited

OTHER PUBLICATIONS

Riviere et al., "Single-Shot High-Quality Facial Geometry and Skin Appearance Capture", ACM Transactions on Graphics, DOI: 10.1145/3386569.3392464, vol. 39, No. 4, Article 81, Jul. 2020, pp. 81:1-81:12.
Roich et al., "Pivotal Tuning for Latent-based Editing of Real Images", arXiv:2106.05744, Jun. 10, 2021, 26 pages.
Schwarz et al., "GRAF: Generative Radiance Fields for 3D-Aware Image Synthesis", 34th Conference on Neural Information Processing Systems, 2020, 13 pages.
Shen et al., "InterFaceGAN: Interpreting the Disentangled Face Representation Learned by GANs", arXiv:2005.09635, Oct. 29, 2020, 16 pages.
Tretschk et al., "Non-Rigid Neural Radiance Fields: Reconstruction and Novel View Synthesis of a Dynamic Scene From Monocular Video", In Proceedings of the IEEE/CVF International Conference on Computer Vision, 2021, pp. 12959-12960.
Vlasic et al., "Face Transfer with Multilinear Models", ACM Transactions on Graphics, 2005, pp. 426-433.
Wang et al., "Learning Compositional Radiance Fields of Dynamic Human Heads", arXiv:2012.09955, Dec. 17, 2020, 10 pages.
Xian et al., "Space-time Neural Irradiance Fields for Free-Viewpoint Video", IEEE Conference on Computer Vision and Pattern Recognition (CVPR), 2021, pp. 9421-9431.
Xie et al., "FiG-NeRF: Figure-Ground Neural Radiance Fields for 3D Object Category Modelling", arXiv:2104.08418, Apr. 17, 2021, 12 pages.
Yenamandra et al., "i3DMM: Deep Implicit 3D Morphable Model of Human Heads", IEEE Conference on Computer Vision and Pattern Recognition (CVPR), 2021, pp. 12803-12813.
Yu et al., "PlenOctrees for Real-time Rendering of Neural Radiance Fields", In Proceedings of the IEEE International Conference on Computer Vision (ICCV), 2021, pp. 5752-5761.
Zhou et al., "CIPS-3D: A 3D-Aware Generator of GANs Based on Conditionally-Independent Pixel Synthesis", arXiv:2110.09788, Oct. 19, 2021, 10 pages.
Feng et al., "Learning an Animatable Detailed 3D Face Model from In-The-Wild Images", DOI: 10.1145/3450626.3459936, ACM Trans. Graph., vol. 40, No. 4, Article 88, Aug. 2021, pp. 88:1-88:13.
Feng et al., "Joint 3D Face Reconstruction and Dense Alignment with Position Map Regression Network", In European conference on computer vision, 2018, 18 pages.
Guo et al., "Towards Fast, Accurate and Stable 3D Dense Face Alignment", arXiv:2009.09960, Sep. 21, 2020, 21 pages.
GB Combined Search and Examination Report for Application No. 2217134.2 dated May 17, 2023.
New Zealand's First Examination Report received for Application No. 794397 dated May 17, 2024, 4 pages.
Canadian First Office Action received for Application No. 3,181,855 dated May 27, 2024, 3 pages.

* cited by examiner

TECHNIQUES FOR MULTI-VIEW NEURAL OBJECT MODELING

CROSS-REFERENCE TO RELATED APPLICATIONS

This application claims priority benefit of the United States Provisional patent application titled, "MULTI-VIEW NEURAL FACE MODELING," filed on Nov. 16, 2021 and having Ser. No. 63/280,101. The subject matter of this related application is hereby incorporated herein by reference.

BACKGROUND

Technical Field

Embodiments of the present disclosure relate generally to computer science and image generation and, more specifically, to techniques for multi-view neural object modeling.

Description of the Related Art

Realistic digital images of heads (e.g., human heads) are required for various computer graphics and computer vision applications. As used herein, an image of a head can include regions corresponding to the skin of a face as well as non-skin regions that can correspond to eyes, ears, scalp hair, facial hair, inside of the mouth, parts of the neck and shoulder, etc. For example, digital images of heads are oftentimes used in the virtual scenes of film productions and in video games, among other things.

One approach for generating digital images of heads involves capturing faces and rendering the captured faces in images. However, conventional facial capture techniques are limited to capturing the skin regions of faces, while non-skin regions are typically not captured. To generate an image of a head that includes both skin and non-skin regions, the non-skin regions that are not captured need to be filled in, or "inpainted," after the captured skin regions are rendered. Conventional techniques for inpainting the non-skin regions oftentimes cannot generate photorealistic heads. In addition, to generate images of heads having desired inpainting details (e.g., eyes and hair that look realistic), manual effort is typically required to tune the parameters used by conventional three-dimensional (3D) modeling and two-dimensional (2D) inpainting techniques, which can be tedious and time consuming.

Another conventional approach for generating images of heads uses trained machine learning models to generate synthetic images of heads. While the synthetic images can look photorealistic, one drawback of conventional machine learning models is that, as a general matter, those models can only generate single images. In the context of heads, the single images are typically limited to nearly frontal views of the heads. When conventional machine learning models are used to generate images of heads from other viewpoints, such as profile views of heads, those images can suffer from inconsistencies in the head identity and appearance across viewpoints. As used herein, a "head identity" refers to aspects of the appearance of a head that are considered distinct and help differentiate one head from another head. In addition, conventional machine learning models require relatively large data sets, such as a large number of images of mostly frontal heads, to train.

As the foregoing illustrates, what is needed in the art are more effective techniques for generating images of heads.

SUMMARY

One embodiment of the present disclosure sets forth a computer-implemented method for rendering an image of an object. The method includes tracing a ray through a pixel into a virtual scene, and sampling one or more positions along the ray. The method further includes applying a machine learning model to the one or more positions and an identifier (ID) code associated with an object to determine, for each position included in the one or more positions, a density, a diffuse color, and specular color. In addition, the method includes computing a color of a pixel based on the density, the diffuse color, and the specular color corresponding to each position included in the one or more positions.

Another embodiment of the present disclosure sets forth a computer-implemented method for training a machine learning model. The method includes receiving a first set of images of one or more objects that are captured from a plurality of viewpoints. The method further includes generating a second set of images of the one or more objects from another plurality of viewpoints. In addition, the method includes training, based on the first set of images and the second set of images, a machine learning model, where the machine learning model includes a neural radiance field model and an identity model, and where the identity model maps an identifier (ID) code to (i) a deformation ID code that encodes a geometric deformation from a canonical object geometry, and (ii) a canonical ID code that encodes an appearance within a space associated with the canonical object geometry.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is the disclosed techniques can be used to generate photorealistic images of objects, such as images of heads that include non-skin regions in addition to skin regions. The disclosed machine learning model can also generate images of multiple different heads from various viewpoints, while requiring less data to train than is required by conventional machine learning models that generate images of heads. In addition, the disclosed machine learning model can be adapted to generate images of a new target head (or other object) by fitting the machine learning model to one or more images of the new target head (or other object). These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, can be had by reference to embodiments, some of which are illustrated in the appended drawings. It is to be noted, however, that the appended drawings illustrate only typical embodiments of this disclosure and are therefore not to be considered limiting of its scope, for the disclosure can admit to other equally effective embodiments.

DETAILED DESCRIPTION

In the following description, numerous specific details are set forth to provide a more thorough understanding of the present invention. However, it will be apparent to one of skill in the art that embodiments of the present invention can be practiced without one or more of these specific details.

System Overview

Figure 1:
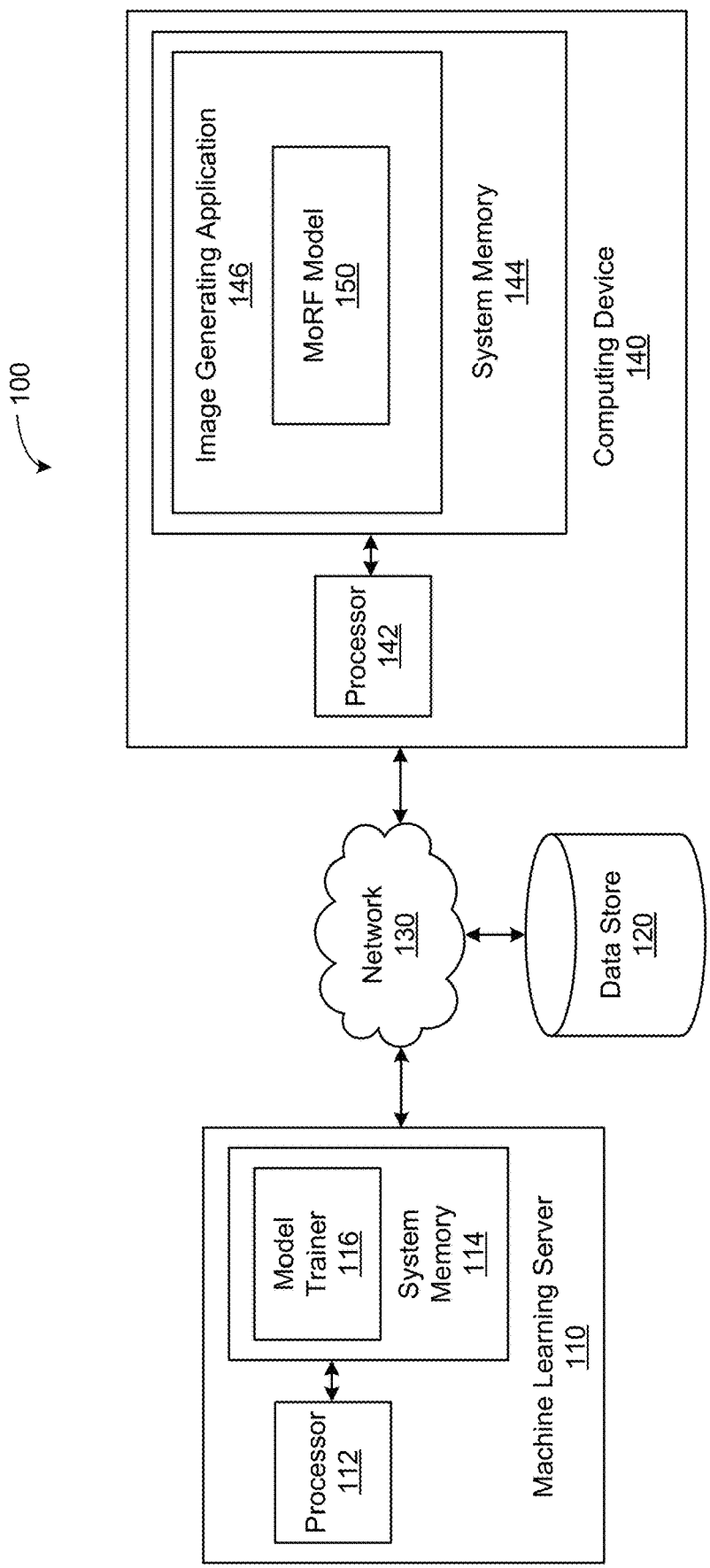
FIG. 1 illustrates a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which can be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard, a mouse, a joystick, a touchscreen, or a microphone. In operation, the processor 112 is the master processor of the machine learning server 110, controlling and coordinating operations of other system components. In particular, the processor 112 can issue commands that control the operation of a graphics processing unit (GPU) (not shown) that incorporates circuitry optimized for graphics and video processing, including, for example, video output circuitry. The GPU can deliver pixels to a display device that can be any conventional cathode ray tube, liquid crystal display, light-emitting diode display, or the like.

The system memory 114 of the machine learning server 110 stores content, such as software applications and data, for use by the processor 112 and the GPU. The system memory 114 can be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 can be modified as desired. Further, the connection topology between the various units in FIG. 1 can be modified as desired. In some embodiments, any combination of the processor 112, the system memory 114, and a GPU can be replaced with any type of virtual computing system, distributed computing system, or cloud computing environment, such as a public, private, or a hybrid cloud.

In some embodiments, the model trainer 116 is configured to train one or more machine learning models, including a morphable radiance field (MoRF) model 150. The MoRF model 150 is a generative machine learning model that outputs densities, diffuse colors, and specular colors for positions in three-dimensional (3D) space given the positions and an identifier (ID) of a head as input. The exemplar architecture of the MoRF model 150, and techniques for training the same, are discussed in greater detail below in conjunction with FIGS. 3, 4A, 4B, and 8-11. Training data and/or trained machine learning models, including the MoRF model 150, can be stored in the data store 120. In some embodiments, the data store 120 can include any storage device or devices, such as fixed disc drive(s), flash drive(s), optical storage, network attached storage (NAS), and/or a storage area-network (SAN). Although shown as accessible over the network 130, in some embodiments the machine learning server 110 can include the data store 120.

Once trained, the MoRF model 150 can be deployed for use in rendering images of heads from various viewpoints. Illustratively, an image generating application 146 that utilizes the MoRF model 150 is stored in a system memory 144, and executes on a processor 142, of the computing device 140. In some embodiments, components of the computing device 140, including the system memory 144 and the processor 142 can be similar to corresponding components of the machine learning server 110.

It will be appreciated that the system 100 shown herein is illustrative and that variations and modifications are possible. For example, the number of machine learning servers and computing devices can be modified as desired. Further, the functionality included in any of the applications can be divided across any number of applications or other software that are stored and executed via any number of computing systems that are located in any number of physical locations.

Figure 2:
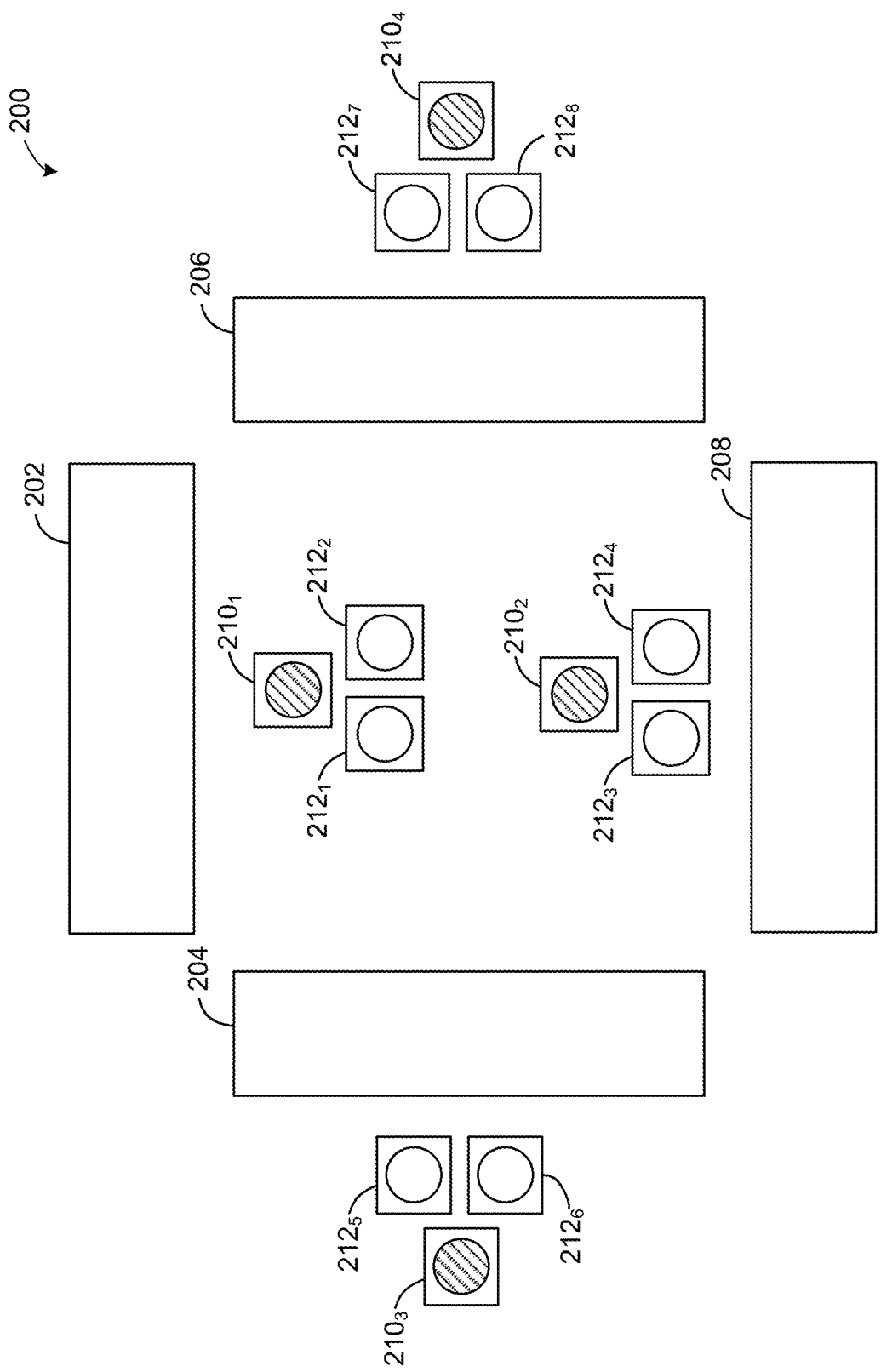
FIG. 2 illustrates the frontal view of an exemplar camera system for capturing heads of individuals, according to various embodiments.

FIG. 2 illustrates the frontal view of an exemplar camera system 200 for capturing heads of individuals, according to various embodiments. In some embodiments, the camera system 200 is used to capture data for training the MoRF model 150, as discussed in greater detail below in conjunction with FIGS. 4A-4B and 9. As shown, the camera system 200 includes polarized light sources 202, 204, 206, and 208; cross-polarized cameras 210$_{1-4}$ (collectively referred to herein as "cross-polarized cameras 210" and individually referred to herein as "a cross-polarized camera 210"), and cameras that are not cross-polarized 212$_{1-8}$ (collectively referred to herein as "cameras that are not cross-polarized 212" and individually referred to herein as "a camera that is not cross-polarized 212").

In operation, the polarized light sources 202, 204, 206, and 208 produce light having a particular polarization that is directed toward an individual who is seated in front of the camera system 200. In some embodiments, the particular polarization can be any linear polarization (e.g., horizontal polarization or vertical polarization), circular polarization (e.g., left or right circular polarization), or elliptical polarization, and any suitable light sources can be used. For example, the polarized light sources 202, 204, 206, and 208 could include light-emitting diodes (LEDs) or studio flashes (e.g., a floor-standing light), with horizontal polarizing filters placed in front of the LEDs or studio flashes. In some embodiments, the polarized light produced by the polarized light sources 202, 204, 206, and 208 can be substantially uniform, i.e., light that is incident on a head from different directions (e.g., front, above, below, left, and right) and that does not have any patterns.

The cross-polarized cameras 210 capture light having a polarization orthogonal to the particular polarization of light produced by the polarized light sources 202, 204, 206, and 208. For example, if light produced by the polarized light sources 202, 204, 206, and 208 is horizontally polarized, then the cross-polarized cameras 210 could be configured to capture vertically polarized light, or vice versa. In such a case, the cross-polarized cameras 210 could be digital cameras (e.g., digital single-lens reflex (DSLR) cameras) with linear polarizing filters placed in front of the digital cameras and oriented to pass light having an orthogonal polarization to the linear polarization of light produced by the polarized light sources 202, 204, 206, and 208. As another example, if light produced by the polarized light sources 202, 204, 206, and 208 is left-circularly polarized (or left-handed elliptically polarized), then the cross-polarized cameras 210 can be configured to capture right-circularly polarized (or right-handed elliptically polarized) light, or vice versa. The cross-polarized cameras 210 are color cameras (as opposed to monochrome cameras) in some embodiments.

The cameras that are not cross-polarized 212 capture light produced by the polarized light sources 202, 204, 206, and 208, including light that is not orthogonally polarized with respect to the particular polarization of light produced by the polarized light sources 202, 204, 206, and 208. For example, the cameras that are not cross-polarized 212 could be unpolarized cameras that capture all of the light produced by the polarized light sources 202, 204, 206, and 208. As another example, if light produced by the polarized light sources 202, 204, 206, and 208 is horizontally polarized, then the cameras that are not cross-polarized 212 could be parallel-polarized cameras that capture the horizontally polarized light. In such cases, the parallel-polarized cameras can be parallel-polarized digital cameras (e.g., digital single-lens reflex (DSLR) cameras) with linear polarizing filters placed in front of the digital cameras and oriented to pass through horizontally polarized light from the light sources 202, 204, 206, and 208. Although some examples are described herein with respect to parallel-polarized cameras, it should be understood that techniques disclosed herein are also applicable to other types of cameras that are not cross-polarized in other ways. The cameras that are not cross-polarized 212 can either be monochrome (La, grayscale) cameras or color cameras in some embodiments.

Images captured by the cross-polarized cameras 210 do not include specular highlights, in contrast to images captured by the cameras that are not cross-polarized 212. As a result, the images captured by the cross-polarized cameras 210 can be used to determine appearance properties, such as diffuse albedo, that are caused by subsurface scattering. During subsurface scattering, light bounces under the skin and is absorbed by skin pigments before bouncing back out, which gives skin a "soft" appearance. On the other hand, images captured by the cameras that are not cross-polarized 212 can be used to determine appearance properties including specular intensity and specular lobe. In contrast to subsurface scattering, specular intensity as well as the shape of specular lobes represents highlight caused by light reflecting from the surface of skin. Such highlights are white in color, assuming the light being reflected is white.

Because images captured by the cross-polarized cameras 210 and the cameras that are not cross-polarized 212 can be used separately to determine the non-specular and specular properties of a head, it is not necessary to strobe lights to take multiple shots. Thus, a situation in which strobing of lights is uncomfortable to an individual whose head is being captured can be avoided. Rather than taking multiple shots using strobing in a time-multiplexed manner, the camera system 200 enables view multiplexing, in which only one shot is required, because the polarization of some views are different from the polarization of others.

As shown, the cross-polarized cameras 210 and the cameras that are not cross-polarized 212 are arranged as triplets of cameras, each of which includes a pair of cameras that are not cross-polarized 212 and one cross-polarized camera 210. In operation, one of the triplets of cameras can be used to capture the front of a head, another of the triplets of cameras can be used to capture the bottom of the head that includes the region under the chin as well as the chin itself and a region around the mouth, another of the triplets of cameras can be used to capture the left side of the head, and yet another of the triplets of cameras can be used to capture the right side of the head. Accordingly, the cross-polarized cameras 210 and the cameras that are not cross-polarized 212 provide substantially full coverage of the front and sides of a head.

Images captured by the pairs of cameras that are not cross-polarized 212 can be used to determine the 3D geometry of a head using triangulation techniques. Alternatively, the 3D geometry can be obtained in any technically feasible manner. For example, the 3D geometry could be received from another facial capture system that uses a different set of cameras, a depth camera, or some other scanning system.

Although four triplets of cross-polarized cameras 210 and cameras that are not cross-polarized 212 are shown for illustrative purposes, other embodiments can employ one or more cross-polarized cameras and one or more cameras that are not cross-polarized, arranged in any suitable manner, depending on the amount of facial coverage and specular information that is desired. More cross-polarized cameras, more cameras that are not cross-polarized, or an equal number of cross-polarized cameras and cameras that are not cross-polarized can be used in embodiments. In addition, any of the cross-polarized cameras and the cameras that are not cross-polarized can be arranged inside the boundaries formed by light sources, outside those boundaries, or in any other technically feasible manner (e.g., if the light sources do not form a boundary). It should be understood that diffuse color remains constant when captured by cameras at different viewpoints, but specular information can change when captured by cameras at different viewpoints. For example, one cross-polarized camera and one camera that is not cross-polarized could be used if partial facial coverage and a limited amount of specular information is acceptable (e.g., if only part of the head needs to be reconstructed). As another example, fewer than four triplets of cross-polarized cameras and cameras that are not cross-polarized could be used if the cameras are wide-angle cameras. On the other hand, more than four triplets of cross-polarized cameras and cameras that are not cross-polarized can be used to provide redundancy. In addition, the cross-polarized cameras and cameras that are not cross-polarized can be separated from each, rather than placed together in triplets, so long as complementary image data is captured by the cross-polarized cameras and the cameras that are not cross-polarized. However, pairs of cameras that are not cross-polarized should be close to each other if stereo reconstruction is required.

The camera system 200 can be used to capture diffuse and specular images of a head (e.g., a human head) from multiple viewpoints. The captured images can also be used to reconstruct 3D geometry corresponding to skin regions of the head, as well as to create appearance maps (e.g., diffuse albedo, specular intensity, and roughness maps), which can in turn be used to render images of skin regions of the head from different viewpoints.

Generating Images of Heads Using a Morphable Radiance Field Model

Figure 3:
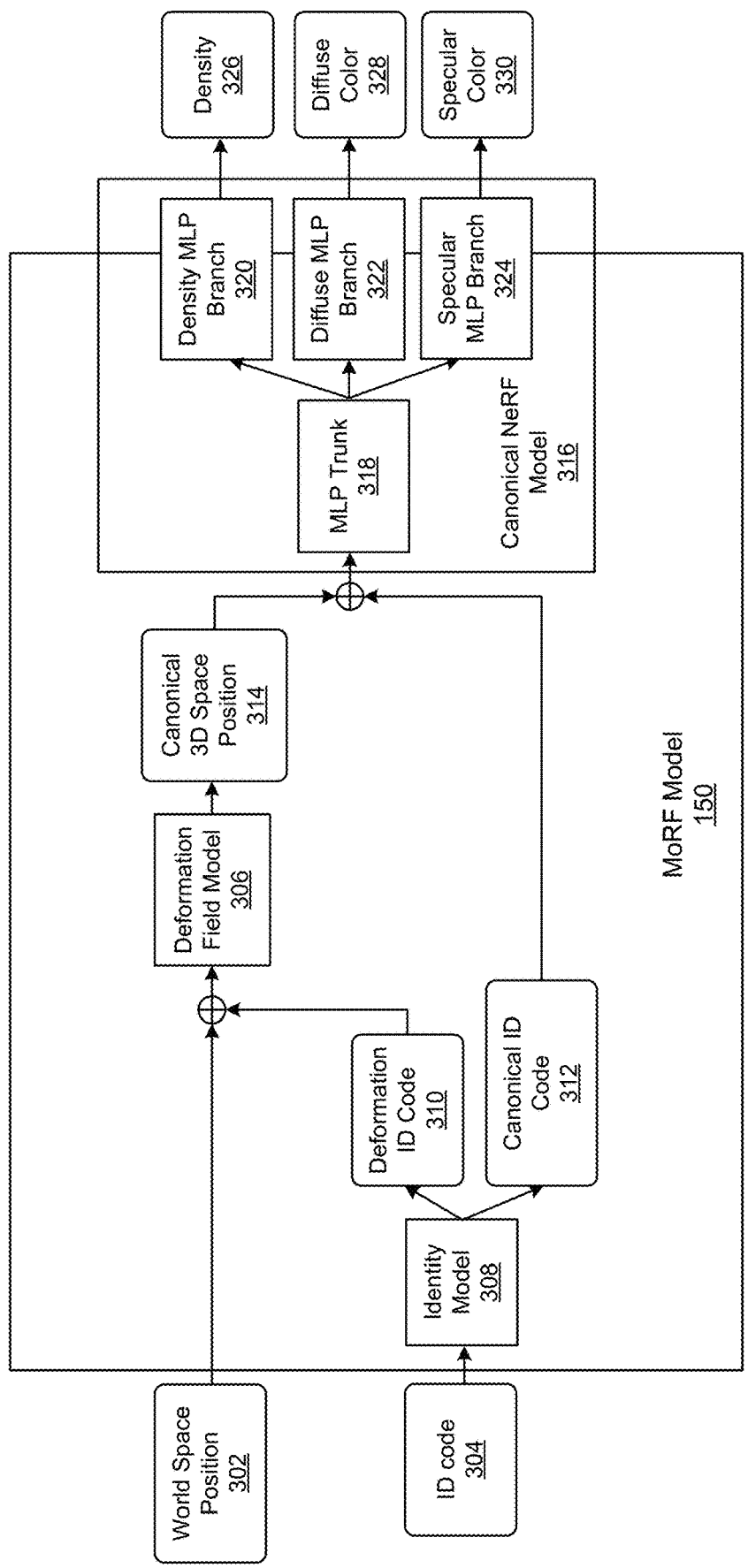
FIG. 3 is a more detailed illustration of the morphable radiance field (MoRF) model of FIG. 1, according to various embodiments.

FIG. 3 is a more detailed illustration of the morphable radiance field (MoRF) model 150 of FIG. 1, according to various embodiments. As shown, the MoRF model 150 is a generative machine learning model that includes a deformation field model 306, an identity model 308, and a canonical neural radiance field (NeRF) model 316. In some embodiments, each of the deformation field model 306, the identity model 308, and the canonical NeRF model 316 is a multi-layer perceptron (MLP) neural network. In operation, the MoRF model 150 takes an identifier (ID) code 304 associated with a particular head and a world space position 302 as input and outputs a density 326, a diffuse color 328, and a specular color 330 corresponding to the particular head and the world space position 302.

As shown, the identity model 308 takes as input the ID code 304 associated with a particular head. The ID code 304 can be associated with a particular head identity and/or a particular expression (e.g., a neutral expression or a non-neutral expression). Given the ID code 304, the identity model 308 generates a deformation ID code 310 and a canonical ID code 312. The deformation ID code 310 is a latent code encoding a geometric deformation from a canonical head geometry. The canonical head geometry is the geometry of a standard head, which can be computed by, e.g., averaging the geometry of skin regions of multiple heads captured via a camera system (e.g., camera system 200). Other non-skin regions of the canonical 3D volume are either learned from training data or are defined in terms of the input canonical ID code 312. The geometric deformation from the canonical head geometry is a non-linear mapping (i.e., a warp) of points in the 3D world space to points in a 3D space associated with the canonical head geometry, which is also referred to herein as the "shape-normalized space." Use of the geometric deformation removes the variability in the shapes of different heads, permitting the variability in appearances across the different heads to be modeled in the shape-normalized space. The canonical ID code 312 is a latent code encoding the appearance of the head associated with the ID code 304 within the shape-normalized space. Intuitively, the deformation ID code 310 indicates where to obtain color and density information within the shape-normalized space for the head associated with the ID code 304, and the canonical ID code 312 indicates what the colors (i.e., appearance) and densities of the head associated with the ID code 304 are in the shape-normalized space.

More formally, for a latent ID code 304 $id \in \mathbb{R}^D$ associated with a particular head, the identity model 308 maps the ID code 304 id to the deformation ID code 310 and the canonical ID code 312 as follows:

$$[id_w, id_c] = ID(id), \quad (1)$$

where $id_w$ is the deformation ID code 310 that encodes the geometric deformation from a canonical head geometry, and $id_c$ is the canonical ID code 312 that encodes the canonical appearance within the shape-normalized space. Accordingly, the design of the identity model 308 defines the latent space model of equation (1). It should be understood that the identity model 308 explicitly aligns (spatially and semantically) corresponding head regions within the shape-normalized space to facilitate modeling of observed variability across different heads. Experience has shown that directly optimizing for per-head deformation ID codes $id_w$ and canonical ID codes $id_c$ becomes poorly constrained as the number of heads in the training data and the dimensionality of the deformation and canonical ID codes increases. Instead, the MoRF model 150 can be trained to predict the deformation and canonical ID codes, resulting in smoother and relatively disentangled embeddings for the deformation and canonical ID codes. The disentangled deformation and canonical ID codes mean that the geometry and appearance of heads can be controlled separately using the MoRF model 150, including to generate images of heads that mix and match various geometries and appearances, discussed in greater detail below in conjunction with FIGS. 6-7.

The deformation field model 306 is a MLP that takes as input a concatenation of a world space position 302 and the deformation ID code 310. During the rendering of an image via ray tracing, the world space position 302 can be a position sampled along a ray that is traced, through a pixel of the image, into a virtual scene. Based on the deformation ID code 310, the deformation field model 306 maps the world space position 302 to a canonical 3D space position 314 in the shape-normalized space.

More formally, the deformation ID code 310 $id_w$ output by the identity model 308 conditions the non-rigid deformation field MLP of the deformation field model 306 that warps the 3D world space position 302 $x=(x, y, z)$ into the canonical 3D space, as follows:

$$x' = DF(x; id_w), \quad (2)$$

where x' is the canonical 3D space position 314. The deformation field model 306 models a learned 3D deformation field that maps all heads onto the shape-normalized space that better constrains the training of each position of the canonical NeRF model 316. Effectively, geometric variability of heads is modeled by the deformation field model 306 as smooth deformations of a canonical 3D head geometry. In some embodiments, the deformation field model 306 outputs a spatially-varying 6-dimensional vector that encodes a 3D rotation $R_x$ and 3D translation $t_x$. The canonical 3D space position 314 can then be obtained as $x'=R_x(x+t_x)$. The smoothness of the warp by the deformation field model 306 can be controlled based on the number of frequency bands used to position-encode the input 3D world space position 302 x. One benefit of the design of the deformation field model 306 is that the deformation field for each ID code can be partially supervised by leveraging a training dataset captured by the camera system 200 that includes multiple heads with dense semantic alignment of the skin surface across the heads, as provided by a registered common 3D geometry.

The canonical NeRF model 316 takes as input a concatenation of the canonical 3D space position 314 and the canonical ID code 312. The canonical NeRF model 316 outputs a density 326, a diffuse color 328, and a specular color 330. The canonical NeRF model 316 includes a MLP trunk 318, a density MLP branch 320, a diffuse MLP branch 322, and a specular MLP branch 324. The density MLP branch 320, the diffuse MLP branch 322, and the specular MLP branch 324 output the density 326, the diffuse color 328, and the specular color 330, respectively, for the world space position 302.

When a ray is traced through a pixel during rendering, the densities (e.g., density 326) output by the MoRF model 150 for sampled positions along the traced ray indicate where the surface of a head is located, because the density at the surface will be higher relative to the densities at other sample points. The diffuse colors (e.g., diffuse color 328) and specular colors (e.g., specular color 330) at the sampled positions along the traced ray can be averaged based on the densities at the sampled positions to compute a color for the pixel through which the ray was traced. Such a rendering process, which is also sometimes referred to as "volumetric rendering," is discussed in greater detail below in conjunction with FIG. 10.

More formally, given the concatenation of the canonical 3D space position 314 and the canonical ID code 312 [x', $id_c$], an appearance in the shape-normalized space, including a diffuse color, a specular color, and a density, can be modeled by the canonical NeRF model 316 as follows:

$$[\sigma, c_d, c_s] = CN(x'; id_c), \quad (3)$$

where $\sigma$ is the density 326, $c_d$ is the diffuse color 328, and $c_s$ is the specular color 330. In some embodiments, the density $\sigma$ is a per-point density, the diffuse color $c_d$ is a viewpoint-invariant diffuse RGB (red, green, blue) color, and the specular color $c_s \in \mathbb{R}^k$ is a local distribution of specular radiance over the full 3D sphere of allowed viewing (ray) directions r. In such cases, the distribution of the specular color $c_s$ can be modeled within a low-frequency spherical harmonics (SH) subspace of order K. Experience has shown that the constraint K=3 for the low-frequency SH subspace can be used to enforce smoothness across viewpoints and permit the MoRF model 150 to be trained with as few as $K^2$ viewpoints. In addition, the canonical NeRF model 316 becomes an omnidirectional NeRF that can be evaluated once at any point x' to provide a single output for all possible viewing directions r. The full color observed from a particular r can then be computed as $c(r)=c_d+c_s^T SH(r)$, where SH(r) is the SH basis along r. For training images that are captured under (or synthetically rendered with) white light, a (scalar) neutral specular color can be added to the diffuse RGB color $c_d$.

In some embodiments, the concatenation of the canonical 3D space position 314 and the canonical ID code 312 [x', $id_c$] that is input into the MLP trunk 318 is also supplied to a mid layer of the MLP trunk 318 via skip links. In such cases, the task of the initial layers of the MLP trunk 318 can be understood as transforming the input into a localized canonical ID code, with the subsequent layers of the MLP trunk 318 then being conditioned by both the global and local canonical ID codes. Although the deformation field model 306 helps constrain the canonical NeRF model 316, the warp supervision of the deformation field model 306 lacks semantic correspondences for complex variations in hair styles of different heads and optional accessories. As a result, the canonical NeRF model 316 can be required to generate new densities in some large areas that would otherwise encode empty space (e.g., areas corresponding to long hair). To enable the canonical NeRF model 316 to generate such densities, all outputs of the canonical NeRF model 316 can be conditioned on the canonical ID code 312 $id_c$, rather than only conditioning color outputs of the canonical NeRF model 316 on the canonical ID code 312 $id_c$.

Figure 4A:
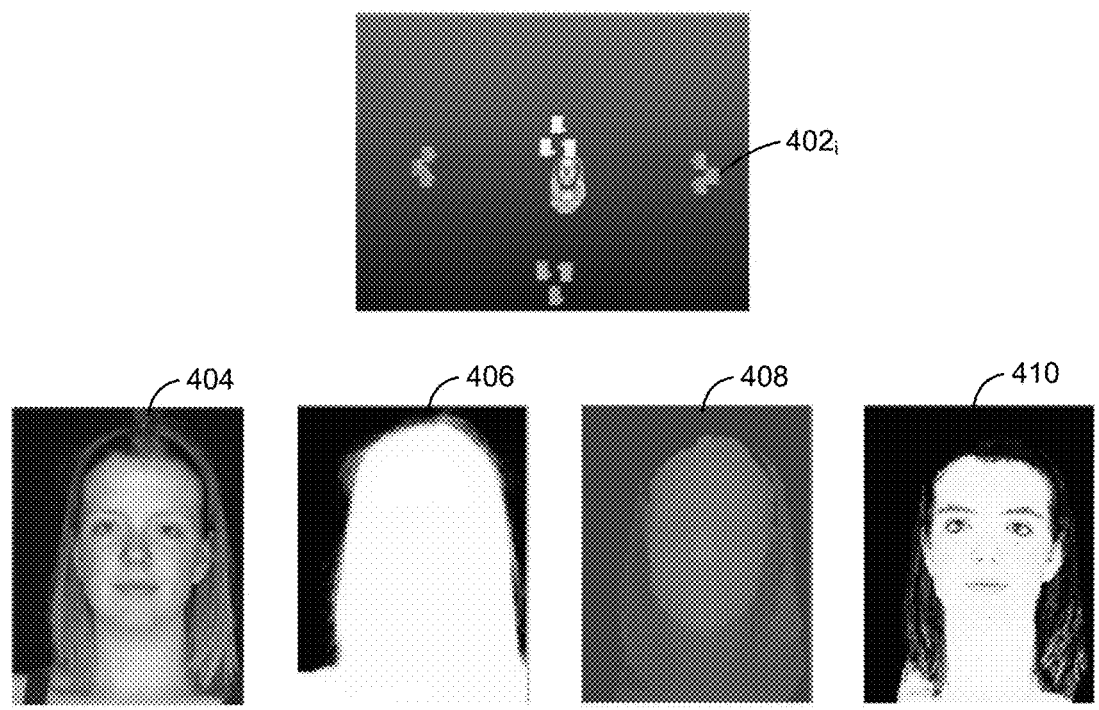
FIG. 4A illustrates exemplar captured views of a head that can be used to train a MoRF model, according to various embodiments.

FIG. 4A illustrates exemplar captured views of a head that can be used to train the MoRF model 150, according to various embodiments. As shown, images of heads, such as image 404, can be captured from multiple viewpoints $402_i$ (referred to herein collectively as viewpoints 402 and individually as a viewpoint 402) to use as training data. For example, in some embodiments, the camera system 200 described above in conjunction with FIG. 2 can be used to capture 12 real views of a head. In some embodiments, the images from multiple viewpoints can include images that include diffuse colors as well as specular information, as well as corresponding images that include only diffuse colors. For example, the images that include specular information and the images that include only diffuse colors can be captured using the cameras of the camera system 200 that are not cross-polarized 212 and the cameras that are cross-polarized 210, respectively. The images that include specular information and the images that include only diffuse colors can be used to train the MoRF model 150 to output diffuse colors (e.g., diffuse color 328) and specular colors (e.g., specular color 330) separately.

Figure 4B:
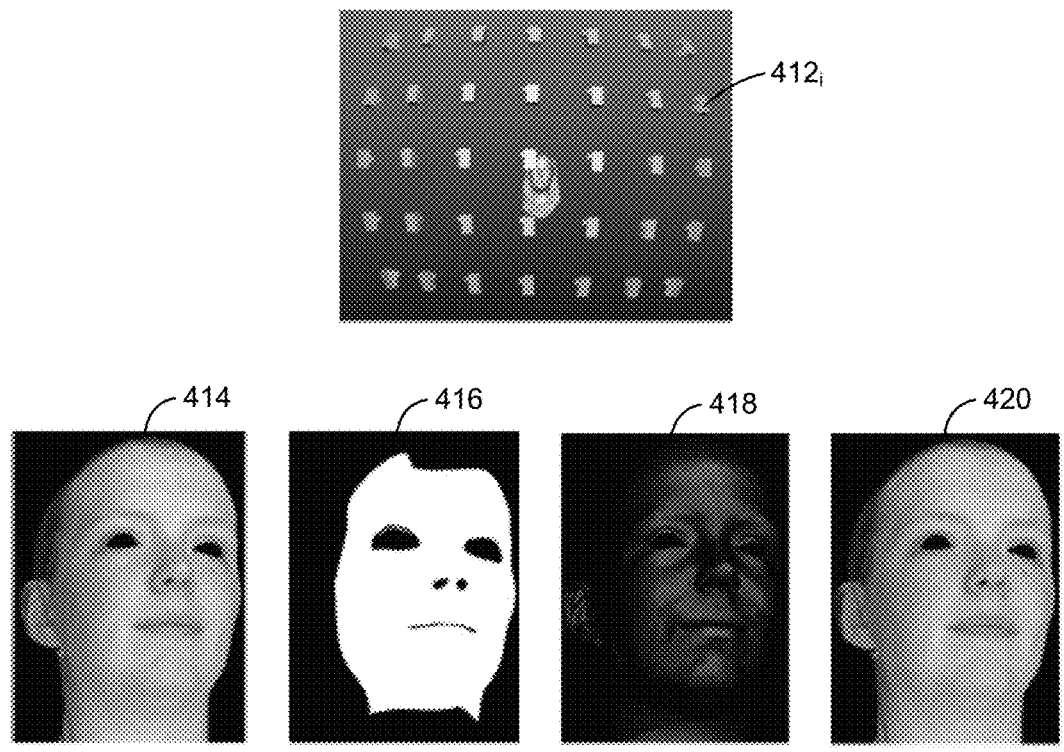
FIG. 4B illustrates exemplar synthetically generated views of a head that can be used in addition to the captured views of FIG. 4A to train a MoRF model, according to various embodiments.

FIG. 4B illustrates exemplar synthetically generated views of a head that can optionally be used in addition to the captured views of FIG. 4A to train the MoRF model 150, according to various embodiments. As shown, synthetic images of heads, such as synthetic image 414, can be rendered from multiple viewpoints $412_i$ (referred to herein collectively as viewpoints 412 and individually as a viewpoint 412) to use as training data. For example, given the appearance and geometry of a head captured via a camera system, such as the camera system 200, synthetic images can be rendered from a number (e.g., 35) of viewpoints using any technically feasible rendering technique. In some embodiments, the synthetic images (e.g., synthetic image 414) include only skin pixels that are indicated by a skin mask (e.g., skin mask 416). Also shown is a diffuse image 420 corresponding to the synthetic image 414 that does not include specular information (shown in a specular image 418). In some embodiments, the synthetically generated images can include diffuse color images (e.g., diffuse image 420) that correspond to synthetic images that include both diffuse colors and specular information.

In some embodiments, training of the MoRF model 150 is supervised using captured images (e.g., image 404) of multiple heads from different viewpoints and optionally synthetically generated images (e.g., synthetic image 414) from additional viewpoints, with a rendering loss on foreground pixels (e.g., foreground pixels indicated by the matting 406 for the image 404 and the skin mask 416 for the synthetic image 414). In such cases, the training can also be supervised with density losses applied on the background, shown in black in the matting 406, and in front of the surface using multiview stereo (MVS) depth maps and confidence maps, such as MVS depth map 408 and confidence map 410, corresponding to the image 404. Any suitable number of captured images and synthetically generated images can be used to train the MoRF model 150. For example, 12 images can be captured of the head of each individual via the camera system 200, and 35 synthetic views that include only skin pixels can be generated via ray tracing and appearance parameters captured in the 12 images. The synthetic images may not provide matting or RGB supervision for non-skin areas (e.g., hair, eyes, etc.) of heads, but experience has shown that use of synthetic images can improve convergence during training, while also constraining facial silhouettes and per-point specular outputs of the MoRF model 150. It should be noted that synthetic images may not be required if, for example, real images are captured from enough viewpoints.

More formally, in some embodiments, per-point diffuse and specular colors $c_d$ and $c_s$ that are output by the MoRF model 150 according to equation (3) are supervised using training images $I_c$ from parallel- and cross-polarized cameras, such as the cameras that are not cross-polarized 212 and the cross-polarized cameras 210, described above in conjunction with the camera system 200, as well as images from synthetic viewpoints that are generated via rendering. For a pixel p seen on camera c, let i denote the index of a point sampled along the camera ray r through p. In such a case, the rendering loss can be computed as:

$$\mathcal{L}_{RGB} = \Sigma_{s,c,p} \| I_{cp} - \Sigma_i \omega_{pi} (c_{dpi} + c_{spi}^T SH(r) 1_{[c \notin c_{xp}]}) \|_2^2, \quad (4)$$

where $\omega_{pi}$ are volumetric rendering weights defined by the densities $\sigma_{pi}$ for integrating along the ray, the indicator $1_{[x]}$ is 0 when the condition $x$ is false, and $c_{xp}$ is the set of cross-polarized cameras, and s is the index of a subject in the training image dataset.

In some embodiments, training of the MoRF model 150 is additionally supervised by the following deformation loss:

$$\mathcal{L}_{DF} = \lambda_{DF} \Sigma_{s,v} \| (v' + \xi n') - DF(v + \xi n; id_w^s) \|_2^2, \quad (5)$$

where $\lambda_{DF}$ is a weight and v is a vertex (with normal n) on the s-th subject's head geometry that correspond to vertex v' (with normal n') in the canonical 3D head geometry, and $\xi \sim \mathcal{N}(0, \sigma)$ is a normal random variable with small deviation, such as $\sigma = 0.05$ mm. The deformation loss of equation (5) supervises training of the deformation field model 306 within a thin volume near the surface of the mesh (face and neck), where reliable correspondences across heads are typically available. In other areas, semantic correspondence can be lacking due to the large variability in both geometry and appearance, such as different hair styles, accessories, etc. In such cases, the deformation field model 306 learns correspondences guided by a smoothness constraint (on the whole volume) and the other losses described herein.

In some embodiments, training of the MoRF model 150 is additionally supervised by the following density loss that promotes sparsity along the ray that is traced to render each pixel p:

$$\mathcal{L}_\sigma = \Sigma_{s,c,p}(\lambda_m \Sigma_i |\sigma_{pi}| 1_{[p \notin M_c]} + \lambda_z \lambda_{cp} \Sigma_i |\sigma_{pi}| 1_{[z_{pi} < z_{cp} - \delta_z]}), \quad (6)$$

where $\sigma_{pi}$ is the density and $z_{pi}$ is the depth at the i-th 3D point sampled along the ray that is traced to render pixel p, while $Z_{cp}$ is the depth computed using MVS reconstruction.

The weight $\lambda_z$ is modulated by the per-point confidence derived from the MVS reconstruction, which typically depicts skin areas with high confidence $\lambda_{cp} \approx 1.0$. The two terms in equation (6) make use of (i) the set of foreground (head) pixels in a matting mask $M_c$ (e.g., matting 406), and (ii) a MVS depth map (e.g., MVS depth map 408).

In some embodiments, training of the MoRF model 150 is additionally supervised by the following ID loss:

$$\mathcal{L}_{ID} = \lambda_{ID} \Sigma_s \| id^s \|_2^2, \quad (7)$$

where $\lambda_{ID}$ is a weight that controls the id space regularization near the origin. In some embodiments, compact ID codes id are initialized from Gaussian white noise and optimized along with weight parameters of the identity model 308, the deformation field model 306, and the canonical NeRF model 316, using the ID loss of equation (7).

In some embodiments, training of the MoRF model 150 includes performing backpropagation with gradient descent and minimizing a loss function that is a sum of the losses of equations (4)-(7), described above. In the sum, the weights $\lambda_{ID}$, $\lambda_{DF}$, $\lambda_m$, and $\lambda_z$ in equations (4)-(7) can be set to, for example, $\lambda_{ID} = 0.1$, $\lambda_{DF} = 10$, $\lambda_m = 0.1$, and $\lambda_z = 0.5$. In some embodiments, the input points x and x', described above, can be position-encoded using 8 frequency bands, and training of the MoRF model 150 can employ a training scheme that masks higher frequency bands. In some embodiments, only the rendering loss $\mathcal{L}_{RGB}$ is applied during the early stages of training to allow the canonical NeRF model 316 to more quickly learn sufficient head geometry and appearance. In such cases, all loss terms can be enabled after a certain period of training, such as 20% of training epochs. Additionally, in some embodiments, a large distance $\delta_z = 100$ mm is initially set in the density loss of equation (6) to constrain only points far from the surface of a head, and the distance $\delta_z$ can be gradually decreased during training.

Figure 5:
FIG. 5 illustrates different types of exemplar images of heads generated from multiple viewpoints using a MoRF model, according to various embodiments.

FIG. 5 illustrates different types of exemplar images of heads generated from multiple viewpoints using the MoRF model 150, according to various embodiments. As shown, images 502 that include new views of a head can be rendered in diffuse color using only the diffuse colors output by the MoRF model 150. Illustratively, the images 502 are photorealistic and demonstrate multiview consistency, as the head identity and appearance are consistent across viewpoints in the images 502. In addition, the head identity closely matches the head identity in captured images (not shown) used to train the MoRF model 150.

In addition to the images 502, images 504 that include new views of the head can be rendered in full color using diffuse and specular colors output by the MoRF model 150. Also shown are images 506 indicating the head depth that is derived from the densities output by the MoRF model 150, as well as images 508 that include only specular colors output by the MoRF model 150. Illustratively, while the geometry and diffuse appearance of the head in the images 502 and 504 remain consistent, the view-dependent specular highlights in the images 502 and 508 change realistically across the rendered viewpoints.

Figure 6:
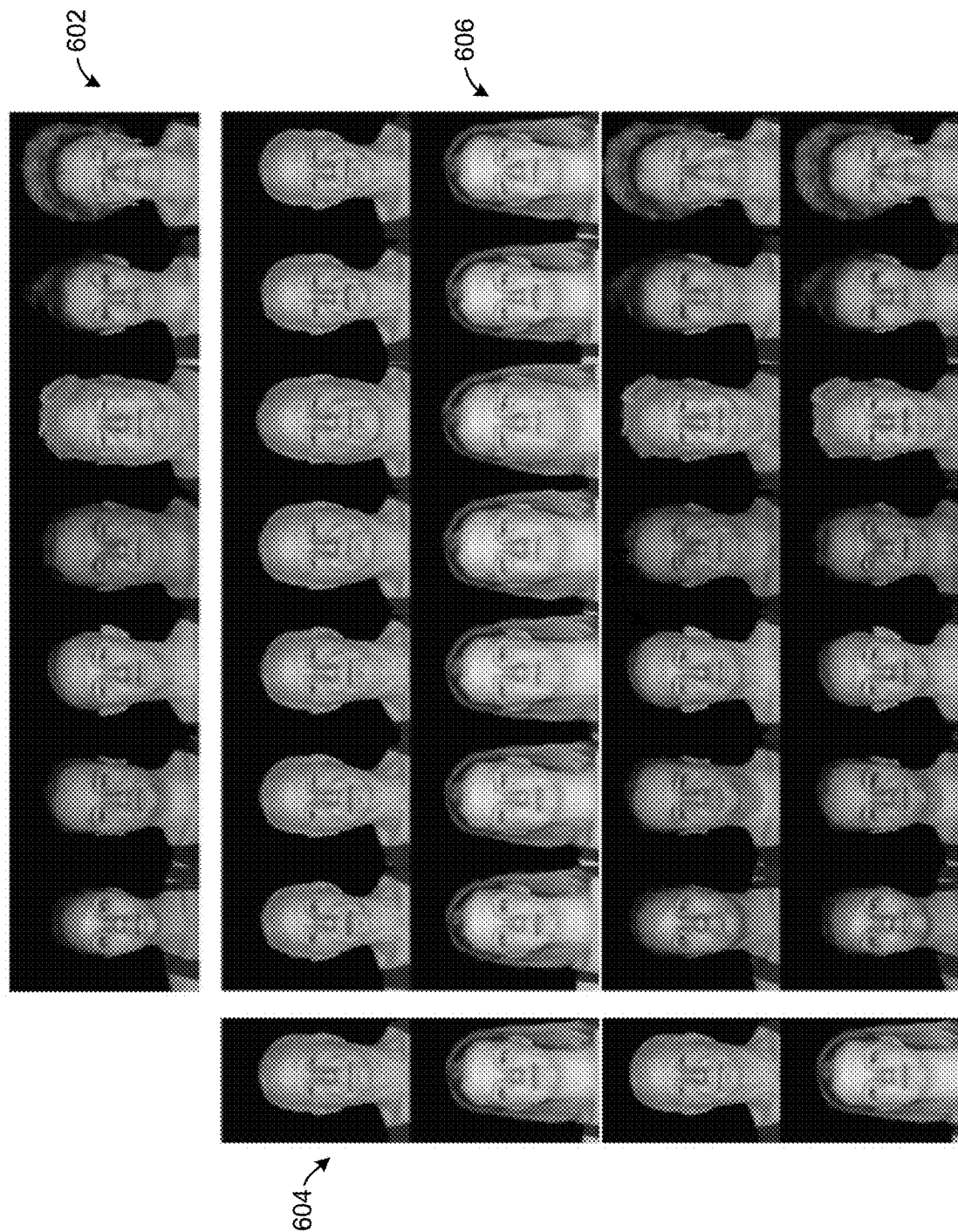
FIG. 6 illustrates exemplar images of synthetic heads generated by mixing the deformation identifier (ID) codes and canonical ID codes associated with different heads, according to various embodiments.

FIG. 6 illustrates exemplar images of synthetic heads generated by mixing the deformation ID codes and canonical ID codes associated with different heads, according to various embodiments. As shown, by mixing deformation ID codes associated with heads 602 and canonical ID codes associated with heads 604, images 606 rendered using the MoRF model 150 include the geometry of the heads 602 and the appearance of the heads 604. As described above in conjunction with FIG. 3, deformation ID codes and canonical ID codes are intermediary latent codes for the 3D geometry and the appearance associated with a head, respectively. The deformation ID codes associated with the heads 602 and the canonical ID codes associated with the heads 604 can be input into the deformation field model 306 and the canonical NeRF model 316, respectively, to generate the images 606. Illustratively, the images 606 are photorealistic renderings of novel head identities, showing good disentanglement of the deformation and canonical ID codes. Although not shown, consistent images of the novel head identities can also be rendered from multiple viewpoints.

Figure 7:
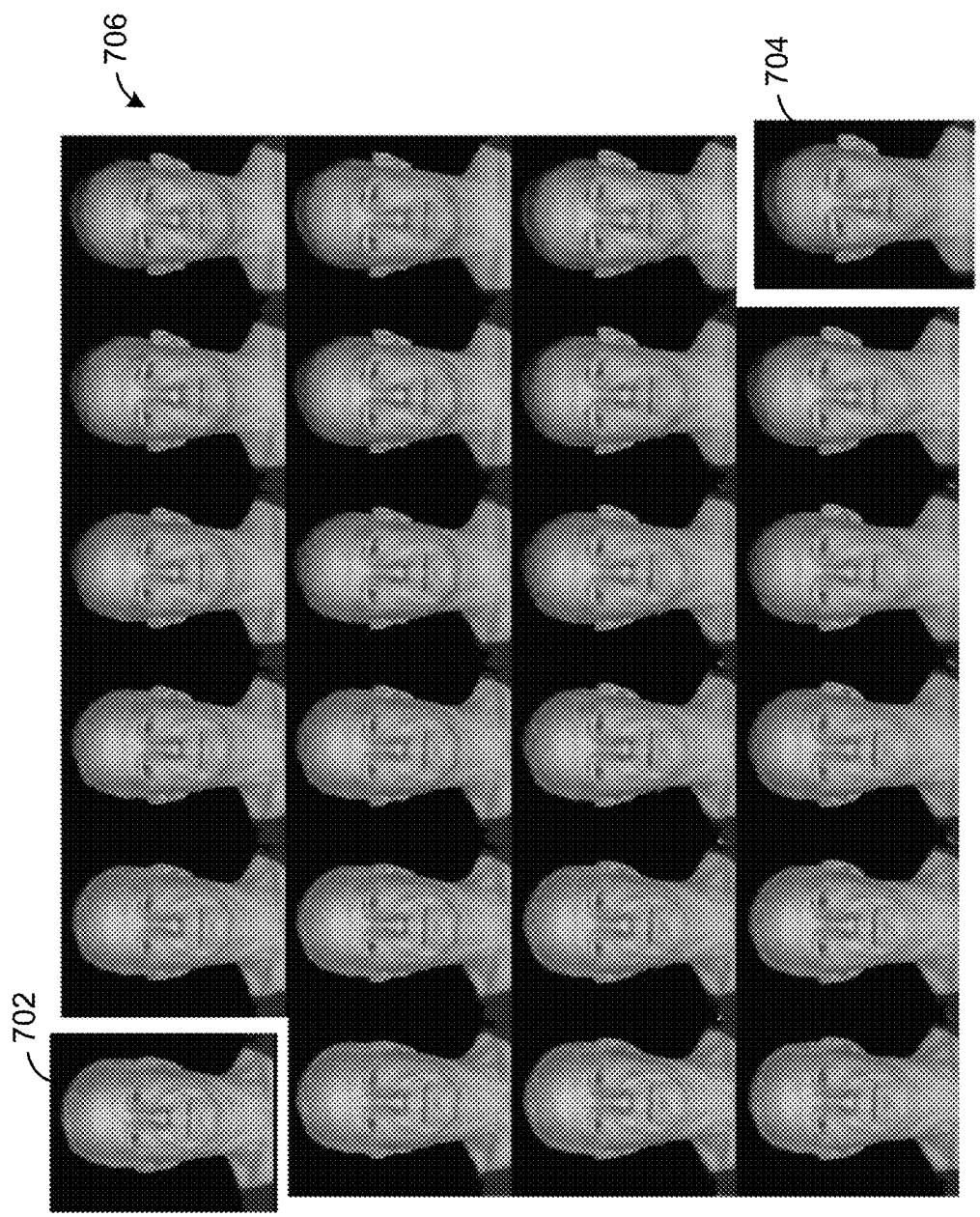
FIG. 7 illustrates exemplar images of synthetic heads generated by interpolating the deformation ID code and the canonical ID code of two heads, according to various embodiments.

FIG. 7 illustrates exemplar images of synthetic heads generated by interpolating the deformation ID code and the canonical ID code of two heads, according to various embodiments. As shown, by interpolating the deformation ID codes and the canonical ID codes associated with heads 702 and 704, images 706 can be generated that include various mixtures between the geometry of the heads 702 and 704 and between the appearances of the heads 702 and 704. Once again, the interpolated deformation ID codes and the canonical ID codes can be input into the deformation field model 306 and the canonical NeRF model 316, respectively, to generate the images 706. In the images 706, the deformation ID codes associated with the heads 702 and 704 have been interpolated along the vertical axis, and the canonical ID codes associated with the heads 702 and 704 have been interpolated along the horizontal axis. Illustratively, the images 706 are photorealistic renderings of novel head identities. Although not shown, consistent images of the novel head identities can also be rendered from multiple viewpoints.

Figure 8:
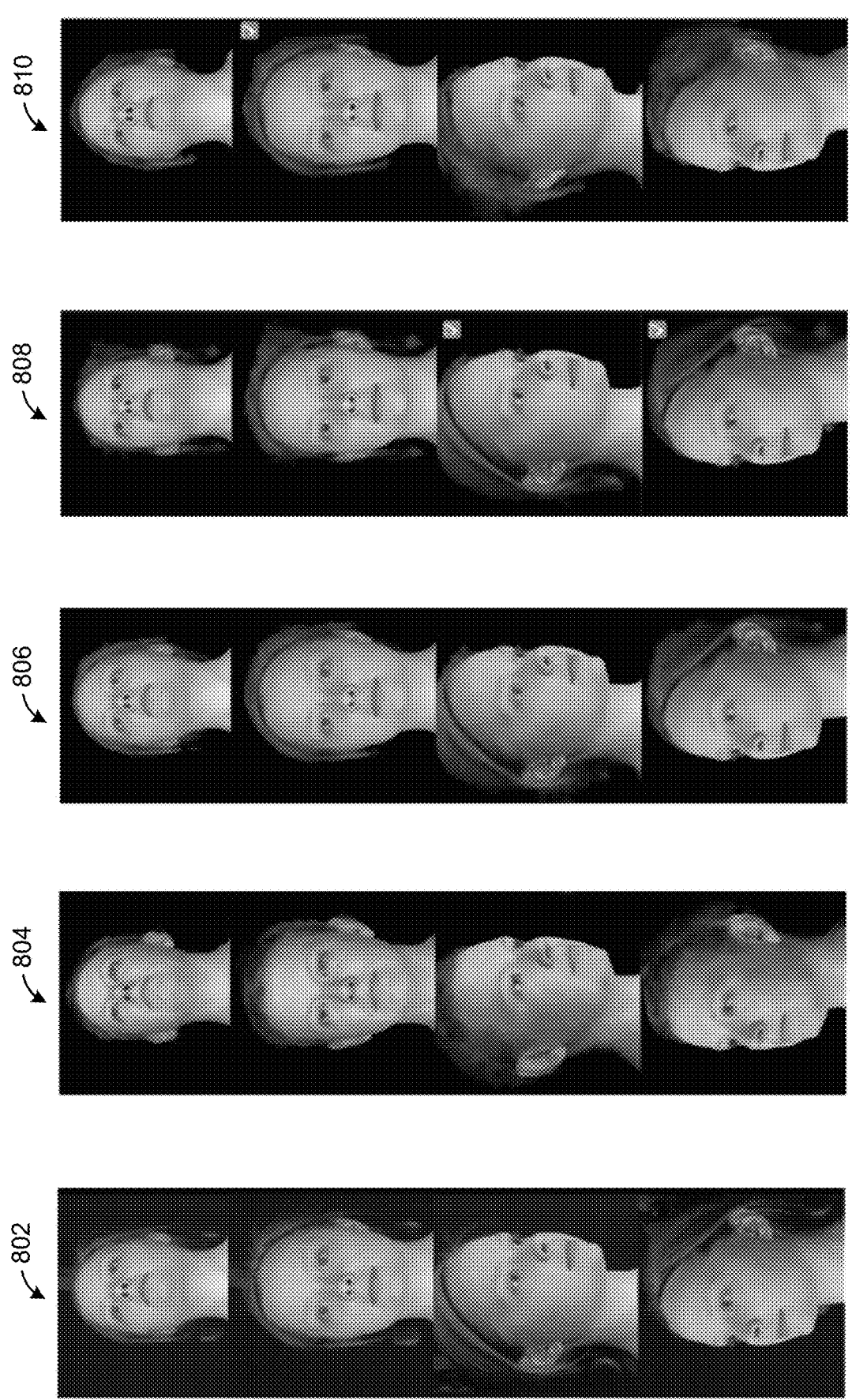
FIG. 8 illustrates an approach for fitting a MoRF model to exemplar images of heads, according to various embodiments.

FIG. 8 illustrates an approach for fitting the pre-trained MoRF model 150 to new exemplar images of heads, according to various embodiments. In some embodiments, given one or more input images and optional 3D geometry of a new head that is a target, the MoRF model 150 can be fit to the new head. Four images 802 of a head that the MoRF model 150 can be fit to are shown for illustrative purposes.

In some embodiments, an iterative nonlinear optimization technique is first performed to determine a fit for the ID code input into the MoRF model 150 based on the one or more images (and optional 3D geometry) of the new head. The ID code is fit first in order to initialize the deformation ID code and the canonical ID code, which are further optimized in their own subspaces via the iterative nonlinear optimization technique. Images 804 of different views of a head rendered by the MoRF model 150 after fitting of the ID code, deformation ID code, and canonical ID code are shown in FIG. 8. In some embodiments, the fitting is applied to downscaled versions of the one or more images of the new head (e.g., downscaled by a factor of 6) and is based on coarse renderings. To obtain relatively robust fits to images of new heads, whose pixels may correspond to "outliers" that the previously trained MoRF model 150 cannot ordinarily represent, the fitting can minimize the following losses. First, the rendering loss of equation (4) can be modified by replacing the L2-norm therein with the L1-norm. Second, a perceptual loss, such as the $\mathcal{L}_{LPIPS}$ loss, can also be applied:

$$\mathcal{L}_{LPIPS} = \lambda_P \Sigma_c \| \Phi(\mathcal{I}_c') - \Phi(\Sigma_i \omega_{pi}(c_{dpi} + c_{spi}^T SH(r) \mathbf{1}_{[c \in c_{xs}]}))\|_F, \quad (8)$$

where $\lambda_P = 0.05$ and a complete image is rendered before the perceptual loss $\mathcal{L}_{LPIPS}$ is applied; $\Phi(\bullet)$ denotes the set of feature activations from layers conv1-1, conv1-2, conv3-3 of a pre-trained VGG-16 network; and $\|\bullet\|$ is the Frobenius norm. Third, if the fitting input includes 3D geometry (in addition to one or more images), the deformation loss $\mathcal{L}_{DF}$ of equation (5) can also be applied. Fourth, the ID loss $\mathcal{L}_{ID}$ can be enforced during the initial stage of fitting the ID code. Fifth, during the subsequent stage of fitting the deformation ID code and the canonical ID code, the following ID loss can be used:

$$\mathcal{L}_{ID}' = \lambda_{ID}(\|id_w - id_w^0\|_2^2 + \|id_c - id_c^0\|_2^2), \quad (9)$$

where $[id_w^0, id_c^0] = \text{ID}(id^0)$ are the codes initially predicted from the optimized code input into the identity model 308 of the MoRF model 150.

Subsequent to fitting of the ID code, the deformation ID code, and the canonical ID code, the deformation ID code and the canonical ID code are frozen, and the MoRF model 150 is re-trained to fine tune the MoRF model 150 for generating images of the head in the images 802. The re-training is similar to the initial training of the MoRF model 150, described above in conjunction with FIG. 4, and the re-training updates weight parameters of the MoRF model 150 based on the images 802. In some embodiments, the re-training uses the same rendering loss $\mathcal{L}_{RGB}$, deformation loss $\mathcal{L}_{DF}$, and density loss $\mathcal{L}_o$, described above in conjunction with FIG. 4B, except the depth-map component of the density loss is not used. Experience has shown that the re-training can take less than 5% of the total time to train the MoRF model 150 from scratch for the head in the images 802. After re-training using 12, 2, and 1 input images, the MoRF model 150 was applied to render images 806, 808, and 810 of the head, respectively.

Figure 9:
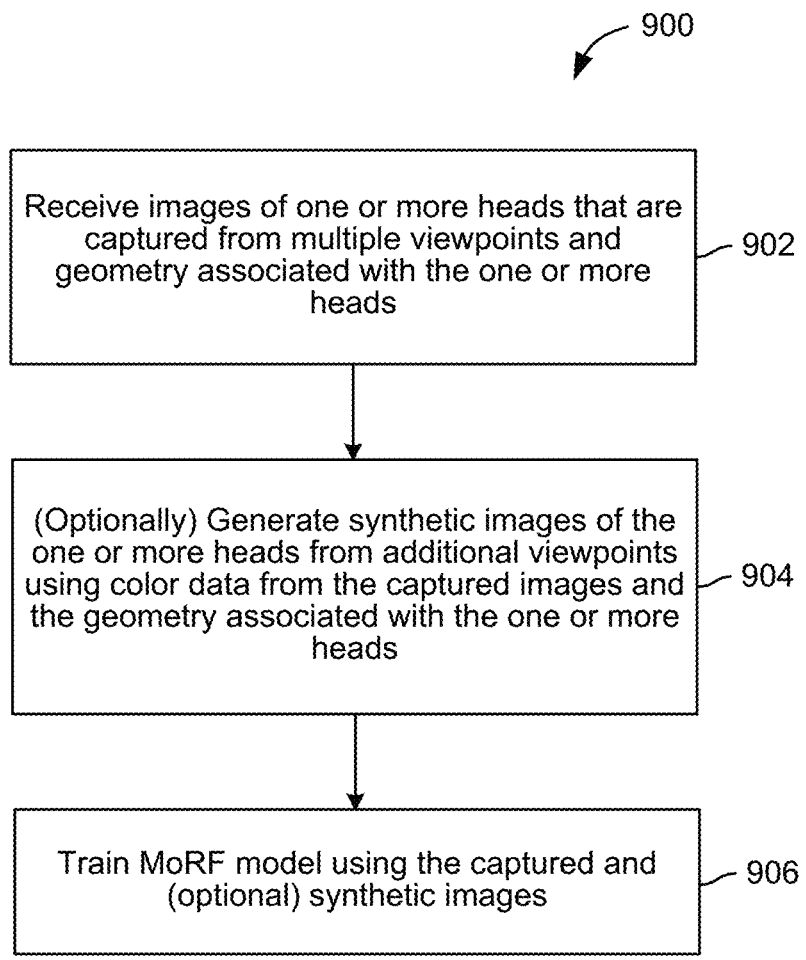
FIG. 9 sets forth a flow diagram of method steps for training a MoRF model, according to various embodiments.

FIG. 9 sets forth a flow diagram of method steps for training the MoRF model 150, according to various embodiments. Although the method steps are described in conjunction with the systems of FIGS. 1-2, persons of ordinary skill in the art will understand that any system configured to perform the method steps, in any order, is within the scope of the present disclosure.

As shown, a method 900 begins at step 902, where the model trainer 116 receives images of one or more heads that are captured from multiple viewpoints and geometry associated with the one or more heads. In some embodiments, the images and geometry can be captured using the camera system 200, described above in conjunction with FIG. 2. As described, the camera system 200 can capture images of a head from multiple viewpoints. Further, the images can include images that include diffuse colors as well as specular information and corresponding images that include only diffuse colors. In addition, the images captured by the camera system 200 can be used to reconstruct 3D geometry corresponding to skin regions of the head.

At step 904, the model trainer 116 (optionally) generates synthetic images of the one or more heads from additional viewpoints using color data from the captured images and the geometry associated with the one or more heads. The synthetic images can be generated using any technically feasible rendering techniques, and can also include images that include diffuse colors as well as specular information and corresponding images that include only diffuse colors.

At step 906, the model trainer 116 trains the MoRF model 150 using the captured and (optional) synthetic images. In some embodiments, training the MoRF model 150 includes performing backpropagation with gradient descent and minimizing a loss function that is a sum of the losses of equations (4)-(7), described above in conjunction with FIG. 4. In some embodiments, ID codes associated with the one or more heads are also learned during training.

Figure 10:
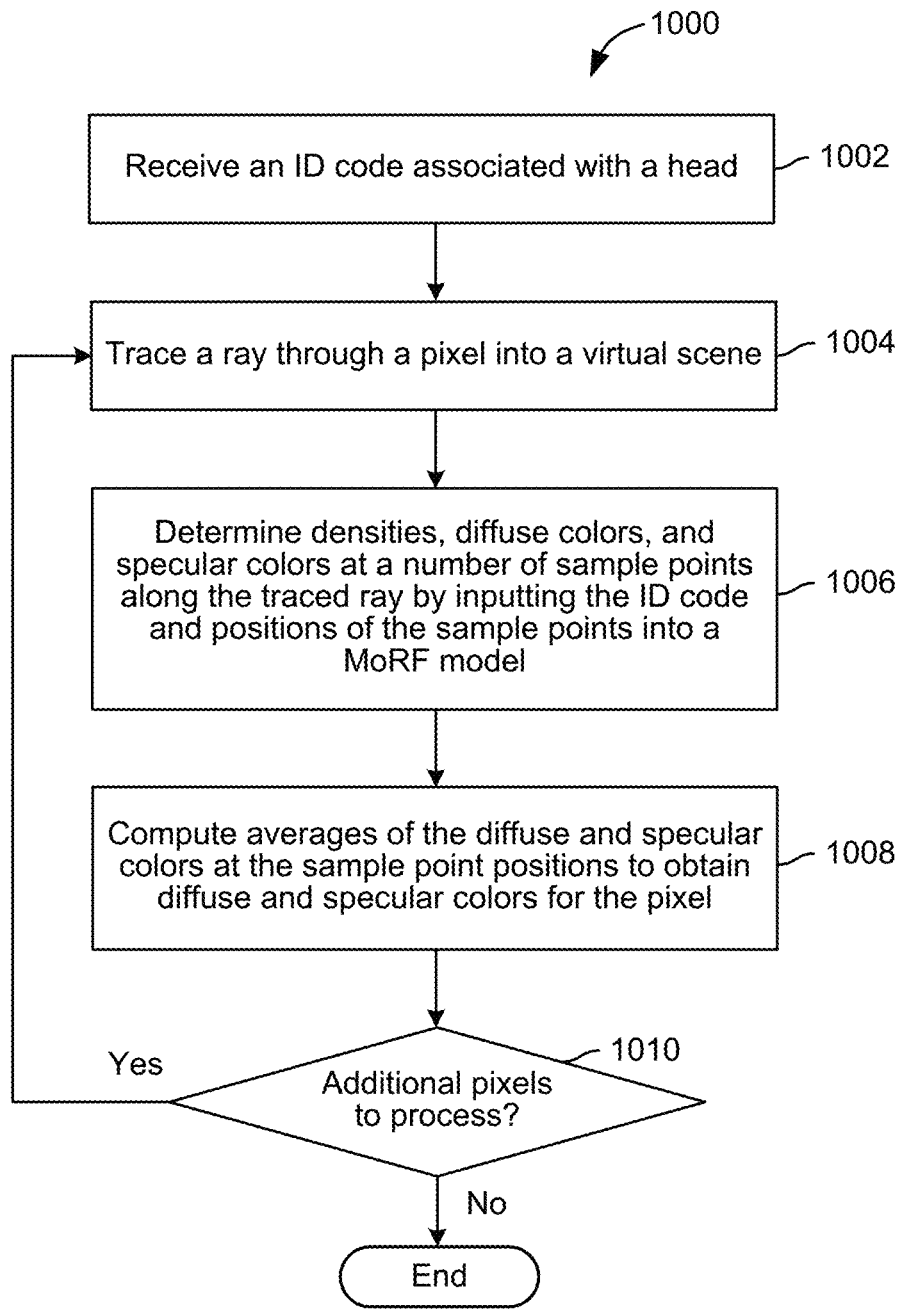
FIG. 10 sets forth a flow diagram of method steps for generating an image of a head using a MoRF model, according to various embodiments.

FIG. 10 sets forth a flow diagram of method steps for generating an image of a head using the MoRF model 150, according to various embodiments. Although the method steps are described in conjunction with the system of FIGS. 1 and 3, persons of ordinary skill in the art will understand that any system configured to perform the method steps, in any order, is within the scope of the present disclosure.

As shown, a method 1000 begins at step 1002, where the image generating application 146 receives an ID code associated with a head. The ID code can be associated with one of the heads used to train the MoRF model 150, an interpolation of multiple ID codes associated with such heads, or another ID code in the latent space of ID codes, such as a randomly sampled ID code near an origin of the latent space.

At step 1004, the image generating application 146 traces a ray through a pixel into a virtual scene. The pixel is one of the pixels of an image being rendered. The ray is traced from a virtual camera placed at a desired viewpoint.

At step 1006, the image generating application 146 determines densities, diffuse colors, and specular colors at a number of sample points along the traced ray by inputting the ID code and positions of the sample points into the MoRF model 150. As described herein, given the ID code and the positions of the sample points, the MoRF model 150 outputs densities, diffuse colors, and specular colors at the sample point positions.

At step 1008, the image generating application 146 computes averages of the diffuse and specular colors at the sample point positions to obtain diffuse and specular colors for the pixel. In some embodiments, each average is an alpha blending average that weights each diffuse or specular color at a sample point based on a density at that sample point, with a higher density leading to a higher weight. Aside from averaging colors, the same set of weights can be used to average depths at the sample point positions to compute and render a depth map, such as one of the images 506 described above in conjunction with FIG. 5.

At step 1010, if there are additional pixels in the image, then the method 1000 returns to step 1002, where the image generating application 146 traces another ray through another pixel into the virtual scene. If there are no additional pixels in the image, the method 1000 ends.

Figure 11:
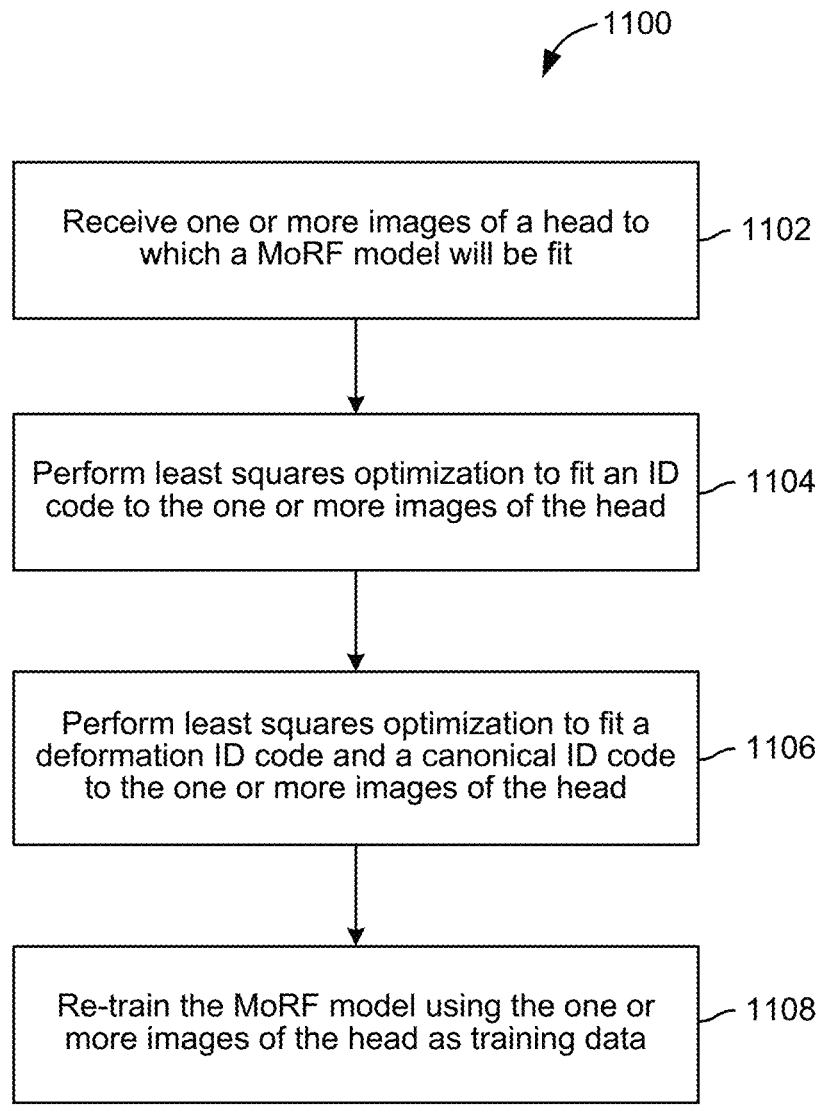
FIG. 11 sets forth a flow diagram of method steps for fitting a MoRF model to one or more images of a head, according to various embodiments.

FIG. 11 sets forth a flow diagram of method steps for fitting the MoRF model 150 to one or more images of a head, according to various embodiments. Although the method steps are described in conjunction with the system of FIG. 1, persons of ordinary skill in the art will understand that any system configured to perform the method steps, in any order, is within the scope of the present disclosure.

As shown, a method 1100 begins at step 1102, where the model trainer 116 receives one or more images of a head to which the MoRF model 150 will be fit. Any number of images can be used in some embodiments. More images will, as a general matter, produce better fitting results. In some embodiments, 3D geometry of the head is also received and used to fit the MoRF model 150.

At step 1104, the model trainer 116 performs an iterative nonlinear optimization technique to fit an ID code to the one or more images of the head. The iterative nonlinear optimization technique for fitting the ID code, including losses used during the optimization, are described above in conjunction with FIG. 8.

At step 1106, the model trainer 116 performs the iterative nonlinear optimization technique to fit a deformation ID code and a canonical ID code to the one or more images of the head. In some embodiments, the iterative nonlinear optimization technique at step 1106 is initialized using a deformation ID code and a canonical ID code that correspond to the ID code determined at step 1104. The iterative nonlinear optimization technique, including losses used during the optimization, for fitting the deformation ID code and the canonical ID code are described above in conjunction with FIG. 8.

At step 1108, the model trainer 116 re-trains the MoRF model 150 using the one or more images of the head as training data. In some embodiments, the deformation ID code and the canonical ID code determined at step 1106 are frozen during the re-training, which is described above in conjunction with FIG. 8. The re-training updates parameters of the MoRF model 150, thereby fine tuning the MoRF model 150 for generating images of the head in the one or more images received at step 1102.

Although described herein primarily with respect to heads as a reference example, techniques disclosed herein can also be used to train and apply a MoRF model to render digital images of other objects, such as full bodies, body parts other than heads, internal organs, etc.

In sum, techniques are disclosed for generating photorealistic images of objects, such as heads, from multiple viewpoints. In some embodiments, a MoRF model that generates images of heads includes an identity model that maps an ID code associated with a head into (1) a deformation ID code that encodes a geometric deformation from a canonical head geometry, and (2) a canonical ID code that encodes a canonical appearance within a shape-normalized space. The MoRF model also includes a deformation field model that maps a world space position to a position in the shape-normalized space based on the deformation ID code. In addition, the MoRF model includes a canonical NeRF model that includes a MLP trunk and a density MLP branch, a diffuse MLP branch, and a specular MLP branch that output densities, diffuse colors, and specular colors, respectively. The MoRF model is trained using images of one or more heads that are captured from multiple viewpoints and (optionally) additional synthetically rendered images of the one or more heads. Subsequent to training, the MoRF model can be applied to render images of the one or more heads, or combinations thereof, from different viewpoints via volumetric rendering. In addition, the MoRF model can be fit to a new target head based on one or more images of the new target head and (optionally) 3D geometry of the new target head.

At least one technical advantage of the disclosed techniques relative to the prior art is the disclosed techniques can be used to generate photorealistic images of objects, such as images of heads that include non-skin regions in addition to skin regions. In particular, the disclosed machine learning model can generate images of multiple different heads from various viewpoints, while requiring less data to train than is required by conventional machine learning models that generate images of heads. In addition, the disclosed machine learning model can be adapted to generate images of a new target head (or other object) by fitting the machine learning model to one or more images of the new target head (or other object). These technical advantages represent one or more technological improvements over prior art approaches.

1. In some embodiments, a computer-implemented method for rendering an image of an object comprises tracing a ray through a pixel into a virtual scene, sampling one or more positions along the ray, applying a machine learning model to the one or more positions and an identifier (ID) code associated with an object to determine, for each position included in the one or more positions, a density, a diffuse color, and a specular color, and computing a color of a pixel based on the density, the diffuse color, and the specular color corresponding to each position included in the one or more positions.

2. The computer-implemented method of clause 1, wherein the machine learning model comprises an identity model that maps the ID code to (i) a deformation ID code that encodes a geometric deformation from a canonical object geometry, and (ii) a canonical ID code that encodes an appearance within a space associated with the canonical object geometry.

3. The computer-implemented method of clauses 1 or 2, wherein the machine learning model comprises a neural radiance field (NeRF) model that comprises a multi-layer perceptron (MLP) trunk, a first MLP branch that computes densities, a second MLP branch that computes diffuse colors, and a third MLP branch that computes specular colors.

4. The computer-implemented method of any of clauses 1-3, wherein computing the color of the pixel comprises averaging the diffuse color corresponding to each position included in the one or more positions based on the density corresponding to the position to determine an averaged diffuse color, averaging the specular color corresponding to each position included in the one or more positions based on the density corresponding to the position to determine an averaged specular color, and computing the color of the pixel based on the averaged diffuse color and the averaged specular color.

5. The computer-implemented method of any of clauses 1-4, further comprising training the machine learning model based on a set of images of one or more objects that are captured from a plurality of viewpoints.

6. The computer-implemented method of any of clauses 1-5, wherein the set of images include a first set of images that include diffuse colors and specular information and a second set of images that include the diffuse colors.

7. The computer-implemented method of any of clauses 1-6, wherein the machine learning model is further trained based on a generated set of images of the one or more objects from another plurality of viewpoints.

8. The computer-implemented method of any of clauses 1-7, further comprising fitting at least one of the ID code or the machine learning model to one or more images of another object.

9. The computer-implemented method of any of clauses 1-8, further comprising fitting the at least one of the ID code or the machine learning model to geometry associated with the another object.

10. The computer-implemented method of any of clauses 1-9, wherein the object is a head.

11. In some embodiments, one or more non-transitory computer-readable storage media include instructions that, when executed by one or more processing units, cause the one or more processing units to perform steps for rendering an image of an object, the steps comprising tracing a ray through a pixel into a virtual scene, sampling one or more positions along the ray, applying a machine learning model to the one or more positions and an identifier (ID) code associated with an object to determine, for each position included in the one or more positions, a density, a diffuse color, and a specular color, and computing a color of a pixel based on the density, the diffuse color, and the specular color corresponding to each position included in the one or more positions.

12. The one or more non-transitory computer-readable storage media of clause 11, wherein the machine learning model comprises an identity model that maps the ID code to (i) a deformation ID code that encodes a geometric deformation from a canonical object geometry, and (ii) a canonical ID code that encodes an appearance within a space associated with the canonical object geometry.

13. The one or more non-transitory computer-readable storage media of clauses 11 or 12, wherein the machine learning model comprises a neural radiance field (NeRF) model that comprises a multi-layer perceptron (MLP) trunk, a first MLP branch that computes densities, a second MLP branch that computes diffuse colors, and a third MLP branch that computes specular colors.

14. The one or more non-transitory computer-readable storage media of any of clauses 11-13, wherein computing the color of the pixel comprises averaging the diffuse color corresponding to each position included in the one or more positions based on the density corresponding to the position to determine an averaged diffuse color, averaging the specular color corresponding to each position included in the one or more positions based on the density corresponding to the position to determine an averaged specular color, and computing the color of the pixel based on the averaged diffuse color and the averaged specular color.

15. The one or more non-transitory computer-readable storage media of any of clauses 11-14, wherein the instructions, when executed by the one or more processing units, further cause the one or more processing units to perform the step of training the machine learning model based on a set of images of one or more object that are captured from a plurality of viewpoints.

16. The one or more non-transitory computer-readable storage media of any of clauses 11-15, wherein the set of images include a first set of images that include diffuse colors and specular information and a second set of images that include the diffuse colors.

17. The one or more non-transitory computer-readable storage media of any of clauses 11-16, wherein the instructions, when executed by the one or more processing units, further cause the one or more processing units to perform the step of fitting at least one of the ID code or the machine learning model to one or more images of another object.

18. The one or more non-transitory computer-readable storage media of any of clauses 11-17, wherein the instructions, when executed by the one or more processing units, further cause the one or more processing units to perform the step of fitting the at least one of the ID code or the machine learning model to geometry associated with the another object.

19. In some embodiments, a computer-implemented method for training a machine learning model comprises receiving a first set of images of one or more object that are captured from a plurality of viewpoints, generating a second set of images of the one or more object from another plurality of viewpoints, and training, based on the first set of images and the second set of images, a machine learning model, wherein the machine learning model comprises a neural radiance field model and an identity model, and wherein the identity model maps an identifier (ID) code to (i) a deformation ID code that encodes a geometric deformation from a canonical object geometry, and (ii) a canonical ID code that encodes an appearance within a space associated with the canonical object geometry.

20. The method of clause 19, wherein the training is based on at least one of a rendering loss, a deformation loss, a density loss, or an ID loss.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments.

Aspects of the present embodiments can be embodied as a system, method or computer program product. Accordingly, aspects of the present disclosure can take the form of an entirely hardware embodiment, an entirely software embodiment (including firmware, resident software, microcode, etc.) or an embodiment combining software and hardware aspects that can all generally be referred to herein as a "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method for rendering an image of an object, the method comprising:
    tracing a ray through a pixel into a virtual scene;
    sampling one or more positions along the ray;
    applying a machine learning model to the one or more positions and an identifier (ID) code associated with an object to determine, for each position included in the one or more positions, a density, a diffuse color, and a specular color, wherein the ID code is used to determine a geometric deformation from a canonical object geometry, wherein the geometric deformation is associated with the object; and
    computing a color of a pixel based on the density, the diffuse color, and the specular color corresponding to each position included in the one or more positions.

2. The computer-implemented method of claim 1, wherein the machine learning model comprises an identity model that maps the ID code to (i) a deformation ID code that encodes the geometric deformation from the canonical object geometry, and (ii) a canonical ID code that encodes an appearance within a space associated with the canonical object geometry.

3. The computer-implemented method of claim 1, wherein the machine learning model comprises a neural radiance field (NeRF) model that comprises a multi-layer perceptron (MLP) trunk, a first MLP branch that computes densities, a second MLP branch that computes diffuse colors, and a third MLP branch that computes specular colors.

4. The computer-implemented method of claim 1, wherein computing the color of the pixel comprises:
    averaging the diffuse color corresponding to each position included in the one or more positions based on the density corresponding to the position to determine an averaged diffuse color.
    averaging the specular color corresponding to each position included in the one or more positions based on the density corresponding to the position to determine an averaged specular color; and
    computing the color of the pixel based on the averaged diffuse color and the averaged specular color.

5. The computer-implemented method of claim 1, further comprising training the machine learning model based on a set of images of one or more objects that are captured from a plurality of viewpoints.

6. The computer-implemented method of claim 5, wherein the set of images include a first set of images that include diffuse colors and specular information and a second set of images that include the diffuse colors.

7. The computer-implemented method of claim 5, wherein the machine learning model is further trained based on a generated set of images of the one or more objects from another plurality of viewpoints.

8. The computer-implemented method of claim 1, further comprising fitting at least one of the ID code or the machine learning model to one or more images of another object.

9. The computer-implemented method of claim 8, further comprising fitting the at least one of the ID code or the machine learning model to geometry associated with the another object.

10. The computer-implemented method of claim 1, wherein the object is a head.

11. One or more non-transitory computer-readable storage media including instructions that, when executed by one or more processing units, cause the one or more processing units to perform steps for rendering an image of an object, the steps comprising:
 tracing a ray through a pixel into a virtual scene;
 sampling one or more positions along the ray;
 applying a machine learning model to the one or more positions and an identifier (ID) code associated with an object to determine, for each position included in the one or more positions, a density, a diffuse color, and a specular color, wherein the ID code is used to determine a geometric deformation from a canonical object geometry, wherein the geometric deformation is associated with the object; and
 computing a color of a pixel based on the density, the diffuse color, and the specular color corresponding to each position included in the one or more positions.

12. The one or more non-transitory computer-readable storage media of claim 11, wherein the machine learning model comprises an identity model that maps the ID code to (i) a deformation ID code that encodes the geometric deformation from the canonical object geometry, and (ii) a canonical ID code that encodes an appearance within a space associated with the canonical object geometry.

13. The one or more non-transitory computer-readable storage media of claim 11, wherein the machine learning model comprises a neural radiance field (NeRF) model that comprises a multi-layer perceptron (MLP) trunk, a first MLP branch that computes densities, a second MLP branch that computes diffuse colors, and a third MLP branch that computes specular colors.

14. The one or more non-transitory computer-readable storage media of claim 11, wherein computing the color of the pixel comprises:
 averaging the diffuse color corresponding to each position included in the one or more positions based on the density corresponding to the position to determine an averaged diffuse color;
 averaging the specular color corresponding to each position included in the one or more positions based on the density corresponding to the position to determine an averaged specular color; and
 computing the color of the pixel based on the averaged diffuse color and the averaged specular color.

15. The one or more non-transitory computer-readable storage media of claim 11, wherein the instructions, when executed by the one or more processing units, further cause the one or more processing units to perform the step of training the machine learning model based on a set of images of one or more object that are captured from a plurality of viewpoints.

16. The one or more non-transitory computer-readable storage media of claim 15, wherein the set of images include a first set of images that include diffuse colors and specular information and a second set of images that include the diffuse colors.

17. The one or more non-transitory computer-readable storage media of claim 11, wherein the instructions, when executed by the one or more processing units, further cause the one or more processing units to perform the step of fitting at least one of the ID code or the machine learning model to one or more images of another object.

18. The one or more non-transitory computer-readable storage media of claim 17, wherein the instructions, when executed by the one or more processing units, further cause the one or more processing units to perform the step of fitting the at least one of the ID code or the machine learning model to geometry associated with the another object.

19. A computer-implemented method for training a machine learning model, the method comprising:
 receiving a first set of images of one or more object that are captured from a plurality of viewpoints;
 generating a second set of images of the one or more object from another plurality of viewpoints; and
 training, based on the first set of images and the second set of images, a machine learning model, wherein the machine learning model comprises a neural radiance field model and an identity model, and wherein the identity model maps an identifier (ID) code to (i) a deformation ID code that encodes a geometric deformation from a canonical object geometry, and (ii) a canonical ID code that encodes an appearance within a space associated with the canonical object geometry.

20. The method of claim 19, wherein the training is based on at least one of a rendering loss, a deformation loss, a density loss, or an ID loss.

* * * * *

UNITED STATES PATENT AND TRADEMARK OFFICE
CERTIFICATE OF CORRECTION

PATENT NO. : 12,236,517 B2
APPLICATION NO. : 17/983246
DATED : February 25, 2025
INVENTOR(S) : Derek Edward Bradley et al.

Page 1 of 1

It is certified that error appears in the above-identified patent and that said Letters Patent is hereby corrected as shown below:

In the Claims

In Column 20, Line 49, in Claim 4, delete "color." and insert -- color; --.

Signed and Sealed this
Twenty-ninth Day of April, 2025

Coke Morgan Stewart
*Acting Director of the United States Patent and Trademark Office*